(12) United States Patent
Oishi et al.

(10) Patent No.: US 11,089,566 B1
(45) Date of Patent: Aug. 10, 2021

(54) COMMUNICATION DEVICE, INFORMATION PROCESSING METHOD, AND STORAGE MEDIUM

(71) Applicant: KABUSHIKI KAISHA TOKAI RIKA DENKI SEISAKUSHO, Aichi (JP)

(72) Inventors: Yoshiki Oishi, Aichi (JP); Satoshi Mori, Aichi (JP); Kenichi Koga, Aichi (JP); Tatsuya Koike, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

(21) Appl. No.: 17/160,964

(22) Filed: Jan. 28, 2021

(30) Foreign Application Priority Data

Feb. 14, 2020 (JP) .............................. JP2020-023217

(51) Int. Cl.
*H04W 64/00* (2009.01)
*H04L 1/00* (2006.01)
*H04L 25/02* (2006.01)

(52) U.S. Cl.
CPC ......... *H04W 64/003* (2013.01); *H04L 1/0003* (2013.01); *H04L 25/0222* (2013.01)

(58) Field of Classification Search
CPC . H04W 64/003; H04L 25/0222; H04L 1/0003
See application file for complete search history.

(56) References Cited

U.S. PATENT DOCUMENTS

| | | | | |
|---|---|---|---|---|
| 2011/0075745 A1* | 3/2011 | Kleider | ............... | H04L 27/2623 375/260 |
| 2012/0230369 A1* | 9/2012 | Zhang | ................ | H04B 1/71632 375/130 |

FOREIGN PATENT DOCUMENTS

WO     2015/176776     11/2015

* cited by examiner

*Primary Examiner* — Kabir A Timory
(74) *Attorney, Agent, or Firm* — Greenblum & Bernstein, P.L.C.

(57) ABSTRACT

A communication device includes: a plurality of wireless communication sections, each configured to be capable of wirelessly transmitting and receiving a signal to and from another communication device; and a control section configured to detect a specific element with regard to each of a plurality of correlation computation results that are obtained by correlating a first signal that is transmitted from the other communication device and that includes change in amplitude with respective second signals obtained when the plurality of wireless communication sections receive the first signal, calculate a reliability parameter that is an indicator indicating whether the detected specific element is appropriate for a processing target, and control a positional parameter determination process on the basis of the reliability parameter, the positional parameter determination process being a process of estimating a positional parameter indicating a position of the other communication device on the basis of the detected specific element.

15 Claims, 18 Drawing Sheets

FIG.11
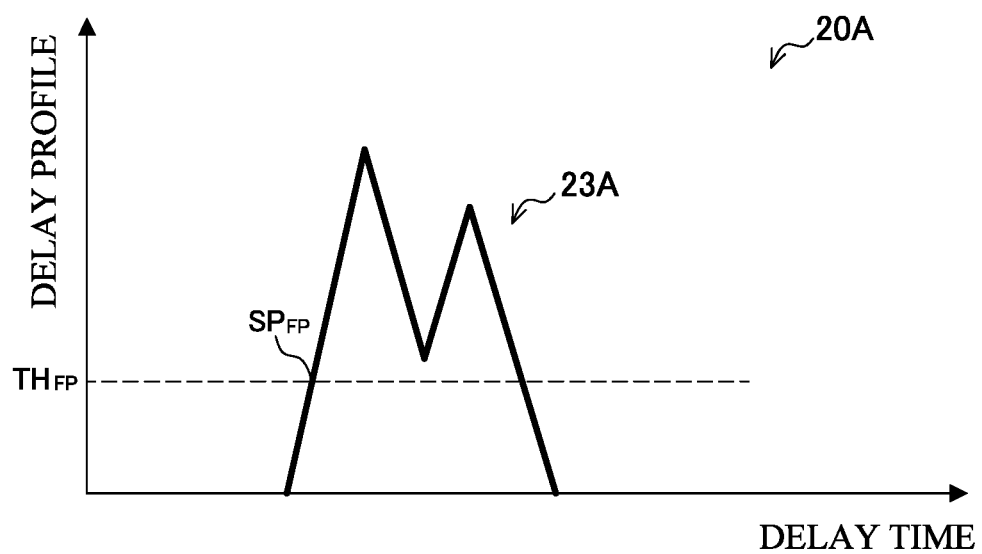
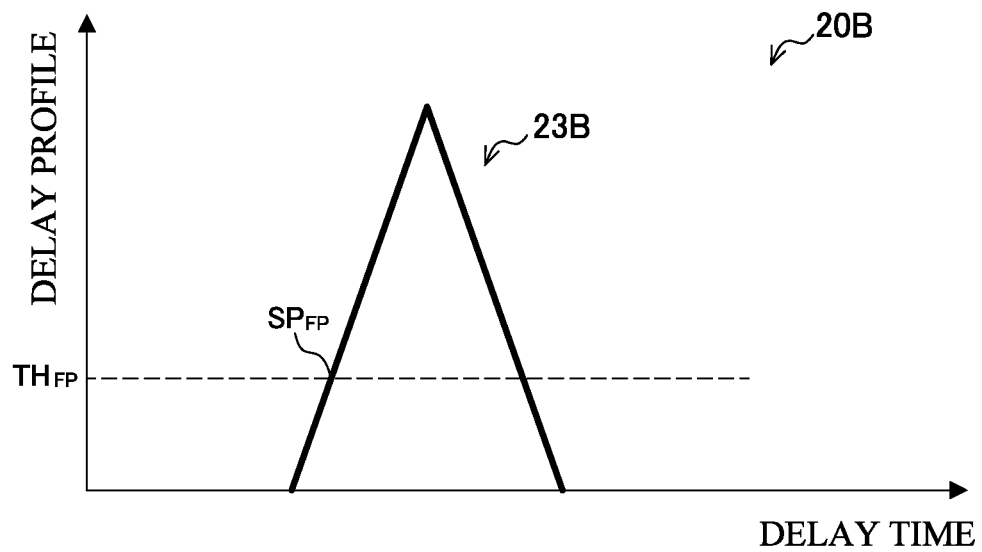

FIG.15
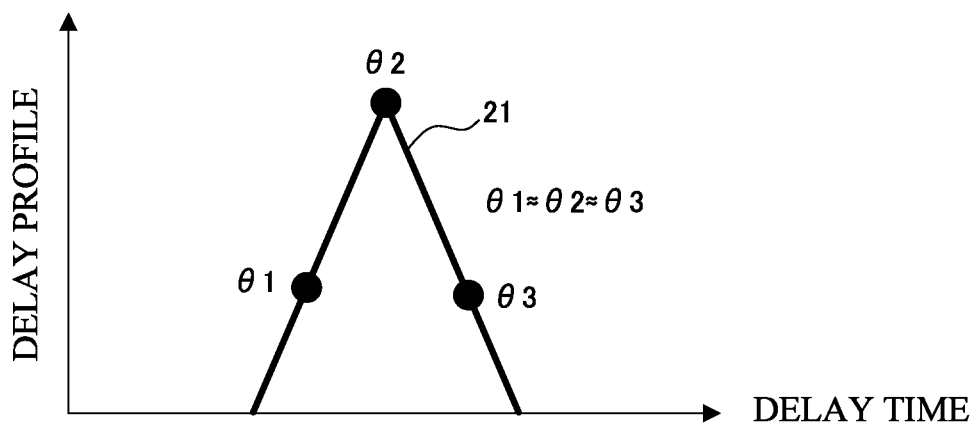
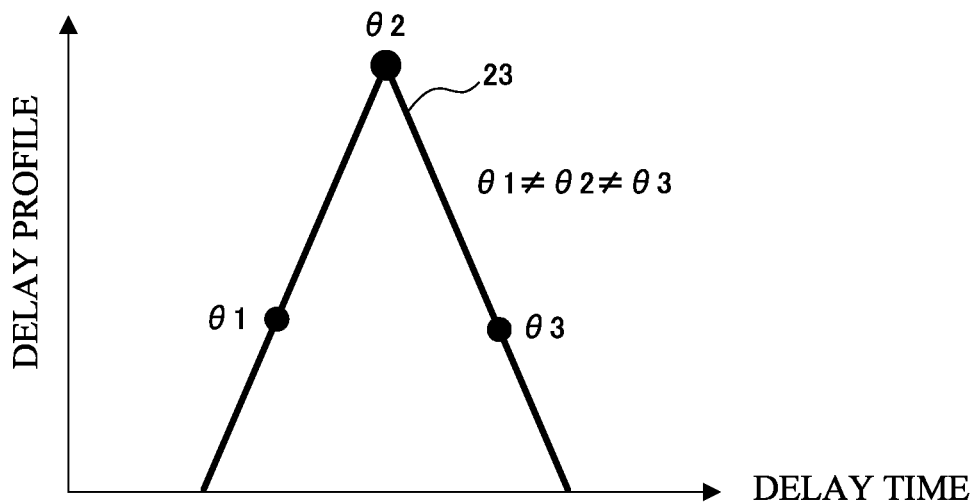

COMMUNICATION DEVICE, INFORMATION PROCESSING METHOD, AND STORAGE MEDIUM

CROSS REFERENCE TO RELATED APPLICATION(S)

This application is based upon and claims benefit of priority from Japanese Patent Application No. 2020-023217, filed on Feb. 14, 2020, the entire contents of which are incorporated herein by reference.

BACKGROUND

The present invention relates to a communication device, an information processing method, and a storage medium.

In recent years, technologies that allow one device to estimate a position of another device in accordance with a result of transmitting/receiving a signal between the devices have been developed. As an example of the technologies of estimating a position, WO 2015/176776 A1 discloses a technology that allows an UWB (ultra-wideband) receiver to estimate an angle of incidence of a wireless signal from an UWB transmitter by performing wireless communication section using UWB.

However, the technology disclosed by WO 2015/176776 A1 does not deal with reduction in accuracy of estimating the angle of incidence of the wireless signal in an environment where an obstacle is interposed between the transmitter and the receiver, or other environments. In addition to dealing with the above-described issue, it has been desired to improve accuracy of the position estimation technologies more.

Accordingly, the present invention is made in view of the aforementioned issues, and an object of the present invention is to provide a mechanism that makes it possible to improve accuracy of estimating a position.

SUMMARY

To solve the above described problem, according to an aspect of the present invention, there is provided a communication device comprising: a plurality of wireless communication sections, each of which is configured to be capable of wirelessly transmitting and receiving a signal to and from another communication device; and a control section configured to correlate a first signal that is transmitted from the other communication device and that includes change in amplitude with respective second signals obtained when the plurality of wireless communication sections receive the first signal, at a designated interval after the other device transmits the first signal, detect, on a basis of a first threshold, a specific element that is one or more of a plurality of elements included in a correlation computation result, with regard to each of a plurality of the correlation computation results that are results obtained by correlating the first signal and the respective second signals at the designated interval and that includes a correlation value indicating magnitude of correlation between the first signal and the second signal as the element obtained at each delay time serving as time elapsed after the other communication device transmits the first signal at the designated interval, calculate a reliability parameter that is an indicator indicating whether the detected specific element is appropriate for a processing target, and control a positional parameter determination process on a basis of the reliability parameter, the positional parameter determination process being a process of estimating a positional parameter indicating a position of the other communication device on a basis of the detected specific element.

To solve the above described problem, according to another aspect of the present invention, there is provided an information processing method that is executed by a communication device including a plurality of wireless communication sections, each of which is configured to be capable of wirelessly transmitting and receiving a signal to and from another communication device, the information processing method comprising: correlating a first signal that is transmitted from the other communication device and that includes change in amplitude with respective second signals obtained when the plurality of wireless communication sections receive the first signal, at a designated interval after the other device transmits the first signal; detecting, on a basis of a first threshold, a specific element that is one or more of a plurality of elements included in a correlation computation result, with regard to each of a plurality of the correlation computation results that are results obtained by correlating the first signal and the respective second signals at the designated interval and that includes a correlation value indicating magnitude of correlation between the first signal and the second signal as the element obtained at each delay time serving as time elapsed after the other communication device transmits the first signal at the designated interval; calculating a reliability parameter that is an indicator indicating whether the detected specific element is appropriate for a processing target; and controlling a positional parameter determination process on a basis of the reliability parameter, the positional parameter determination process being a process of estimating a positional parameter indicating a position of the other communication device on a basis of the detected specific element.

To solve the above described problem, according to another aspect of the present invention, there is provided a storage medium having a program stored therein, the program causing a computer for controlling a communication device including a plurality of wireless communication sections, each of which is configured to be capable of wirelessly transmitting and receiving a signal to and from another communication device, to function as a control section configured to correlate a first signal that is transmitted from the other communication device and that includes change in amplitude with respective second signals obtained when the plurality of wireless communication sections receive the first signal, at a designated interval after the other device transmits the first signal, detect, on a basis of a first threshold, a specific element that is one or more of a plurality of elements included in a correlation computation result, with regard to each of a plurality of the correlation computation results that are results obtained by correlating the first signal and the respective second signals at the designated interval and that includes a correlation value indicating magnitude of correlation between the first signal and the second signal as the element obtained at each delay time serving as time elapsed after the other communication device transmits the first signal at the designated interval, calculate a reliability parameter that is an indicator indicating whether the detected specific element is appropriate for a processing target, and control a positional parameter determination process on a basis of the reliability parameter, the positional parameter determination process being a process of estimating a positional parameter indicating a position of the other communication device on a basis of the detected specific element.

As described above, according to the present invention, it is possible to provide the mechanism that makes it possible to improve accuracy of estimating a position.

BRIEF DESCRIPTION OF THE DRAWINGS

FIG. 11 is graphs illustrating examples of CIRs with regard to a plurality of wireless communication sections.

FIG. 15 is diagrams for describing examples of reliability parameters according to the embodiment.

DETAILED DESCRIPTION OF THE EMBODIMENT(S)

Figure 1:
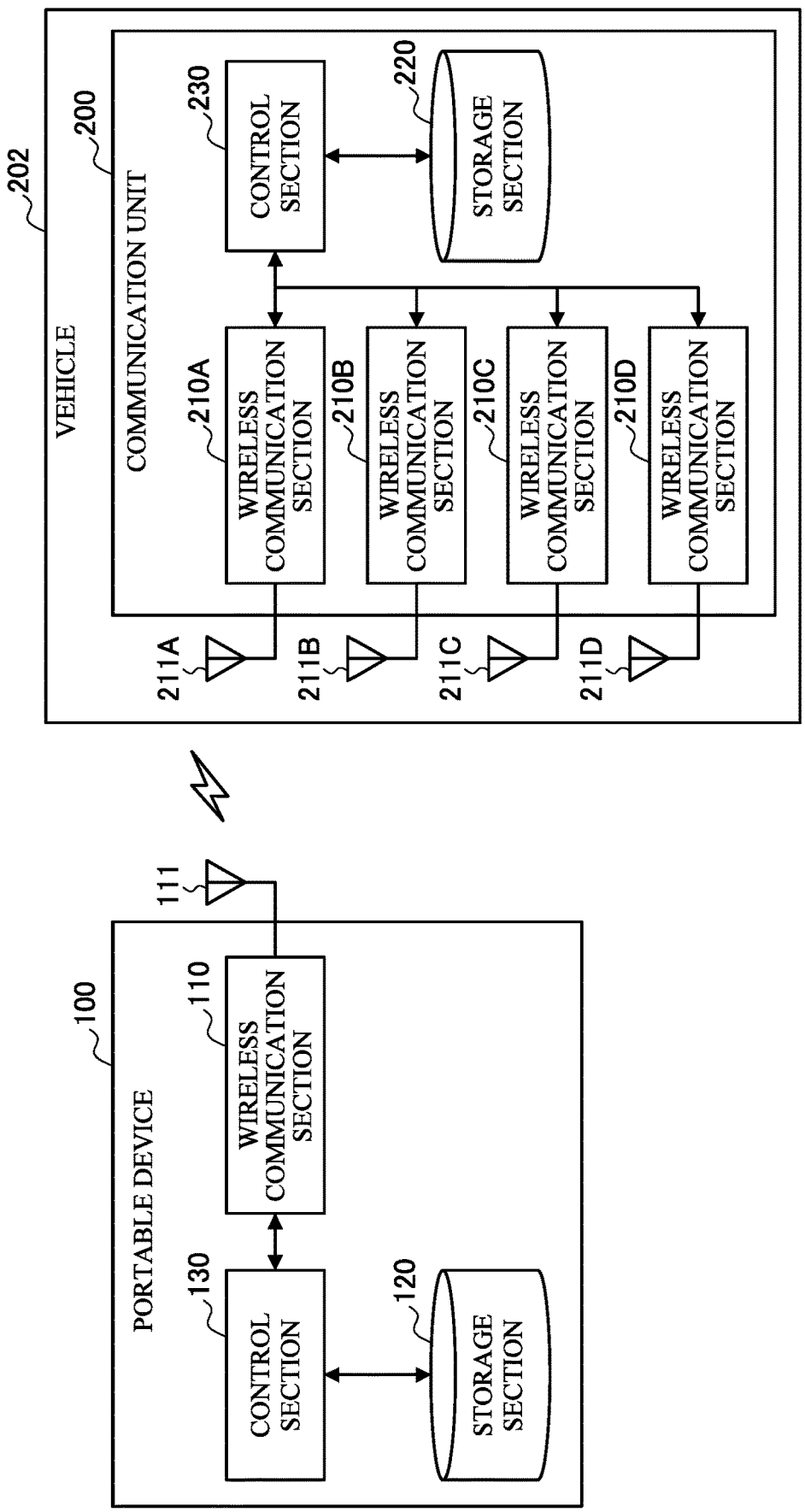
FIG. 1 is a diagram illustrating an example of a configuration of a system according to an embodiment of the present invention.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

Further, in the present specification and the drawings, different alphabets are suffixed to a same reference numeral to distinguish elements which have substantially the same functional configuration. For example, a plurality of elements which have substantially the same functional configuration are distinguished such as wireless communication sections 210A, 210B, and 210C, as necessary. However, when there is no need in particular to distinguish elements that have substantially the same functional configuration, the same reference numeral alone is attached. For example, in the case where it is not necessary to particularly distinguish the wireless communication sections 210A, 210B, and 210C, the wireless communication sections 210A, 210B, and 210C are simply referred to as the wireless communication sections 210.

1. Configuration Example

FIG. 1 is a diagram illustrating an example of a configuration of a system 1 according to an embodiment of the present invention. As illustrated in FIG. 1, the system 1 according to the present embodiment includes a portable device 100 and a communication unit 200. The communication unit 200 according to the present embodiment is installed in a vehicle 202. The vehicle 202 is an example of a usage target of the user.

A communication device of an authenticatee and a communication device of an authenticator are involved in the present embodiment. In the example illustrated in FIG. 1, the portable device 100 is an example of the communication device of the authenticatee, and the communication unit 200 is an example of the communication device of the authenticator.

When a user (for example, a driver of the vehicle 202) carrying the portable device 100 approaches the vehicle 202, the system 1 performs wireless communication for authentication between the portable device 100 and the communication unit 200 installed in the vehicle 202. Next, when the authentication succeeds, the vehicle 202 becomes available for the user by unlocking a door lock of the vehicle 202 and starting an engine of the vehicle 202. The system 1 is also referred to as a smart entry system. Next, respective structural elements will be described sequentially.

(1) Portable Device 100

The portable device 100 is configured as any device to be carried by the user. Examples of the any device include an electronic key, a smartphone, a wearable terminal, and the like. As illustrated in FIG. 1, the portable device 100 includes a wireless communication section 110, a storage section 120, and a control section 130.

The wireless communication section 110 has a function of performing wireless communication with the communication unit 200 installed in the vehicle 202. The wireless communication section 110 wirelessly receives a signal from the communication unit 200 installed in the vehicle 202. In addition, the wireless communication section 110 wirelessly transmits a signal to the communication unit 200.

For example, wireless communication is performed between the wireless communication section 110 and the communication unit 200 by using an ultra-wideband (UWB) signal, for example. In the wireless communication of the UWB signal, it is possible for impulse UWB to measure propagation delay time of a radio wave with high accuracy by using the radio wave of ultra-short pulse width of a nanosecond or less, and it is possible to perform ranging with high accuracy on the basis of the propagation delay time. Note that, the propagation delay time is time from transmission to reception of the radio wave. The wireless communication section 110 is configured as a communication interface that makes it possible to perform communication by using the UWB signals, for example.

Note that, the UWB signal may be transmitted/received as a ranging signal, an angle estimation signal, and a data signal, for example. The ranging signal is a signal transmitted and received in the ranging process (to be described later). The ranging signal may be configured in a frame format that does not include a payload part for storing data or in a frame format that includes the payload part. The angle estimation signal is a signal transmitted and received in an angle estimation process (to be described later). The angle estimation signal may be configured in a way similar to the ranging signal. The data signal is preferably configured in the frame format that includes the payload part for storing the data.

Here, the wireless communication section 110 includes at least one antenna 111. In addition, the wireless communication section 110 transmits/receives a wireless signal via the at least one antenna 111.

The storage section 120 has a function of storing various kinds of information for operating the portable device 100. For example, the storage section 120 stores a program for operating the portable device 100, and an identifier (ID), password, and authentication algorithm for authentication, and the like. For example, the storage section 120 includes a storage medium such as flash memory and a processing device that performs recording/playback on/of the storage medium.

The control section 130 has a function of executing processes in the portable device 100. For example, the control section 130 controls the wireless communication section 110 to perform communication with the communication unit 200 of the vehicle 202. The control section 130 reads information from the storage section 120 and writes information into the storage section 120. The control section 130 also functions as an authentication control section that controls an authentication process between the portable device 100 and the communication unit 200 of the vehicle 202. For example, the control section 130 may include a central processing unit (CPU) and an electronic circuit such as a microprocessor.

(2) Communication Unit 200

The communication unit 200 is prepared in association with the vehicle 202. Here, it is assumed that the communication unit 200 is installed in the vehicle 202 in such a manner that the communication section 200 is installed in a vehicle interior of the vehicle 202, the communication section 200 is built in the vehicle 202 as a communication module, or in other manners. Alternatively, the communication unit 200 may be prepared as a separate object from the vehicle 202 in such a manner that the communication unit 200 is installed in a parking space for the vehicle 202 or in other manners. In this case, the communication unit 200 may wirelessly transmit a control signal to the vehicle 202 on the basis of a result of communication with the portable device 100 and may remotely control the vehicle 202. As illustrated in FIG. 1, the communication unit 200 includes a plurality of wireless communication sections 210 (210A to 210D), a storage section 220, and a control section 230.

The wireless communication section 210 has a function of performing wireless communication with the wireless communication section 110 of the portable device 100. The wireless communication section 210 wirelessly receives a signal from the portable device 100. In addition, the wireless communication section 210 wirelessly transmits a signal to the portable device 100. The wireless communication section 210 is configured as a communication interface that makes it possible to perform communication by using the UWB, for example.

Here, each of the wireless communication sections 210 includes an antenna 211. In addition, each of the wireless communication sections 210 transmits/receives a wireless signal via the antenna 211.

The storage section 220 has a function of storing various kinds of information for operating the communication unit 200. For example, the storage section 220 stores a program for operating the communication unit 200, an authentication algorithm, and the like. For example, the storage section 220 includes a storage medium such as flash memory and a processing device that performs recording/playback on/of the storage medium.

The control section 230 has a function of controlling overall operation performed by the communication unit 200 and in-vehicle equipment installed in the vehicle 202. For example, the control section 230 controls the wireless communication sections 210 to perform communication with the portable device 100. The control section 230 reads information from the storage section 220 and writes information into the storage section 220. The control section 230 also functions as an authentication control section that controls the authentication process between the portable device 100 and the communication unit 200 of the vehicle 202. In addition, the control section 230 also functions as a door lock control section that controls a door lock of the vehicle 202, and opens and closes the door lock. The control section 230 also functions as an engine control section that controls the engine of the vehicle 202, and starts/stops the engine. Note that, a motor or the like may be installed as a power source in the vehicle 202 in addition to the engine. For example, the control section 230 is configured as an electronic circuit such as an electronic control unit (ECU).

2. Estimation of Positional Parameter

<2.1. Positional Parameter>

The communication unit 200 (specifically, control section 230) according to the present embodiment performs a positional parameter estimation process of estimating a positional parameter that represents a position of the portable device 100. Hereinafter, with reference to FIG. 2 to FIG. 4, various definitions related to the positional parameter will be described.

Figure 2:
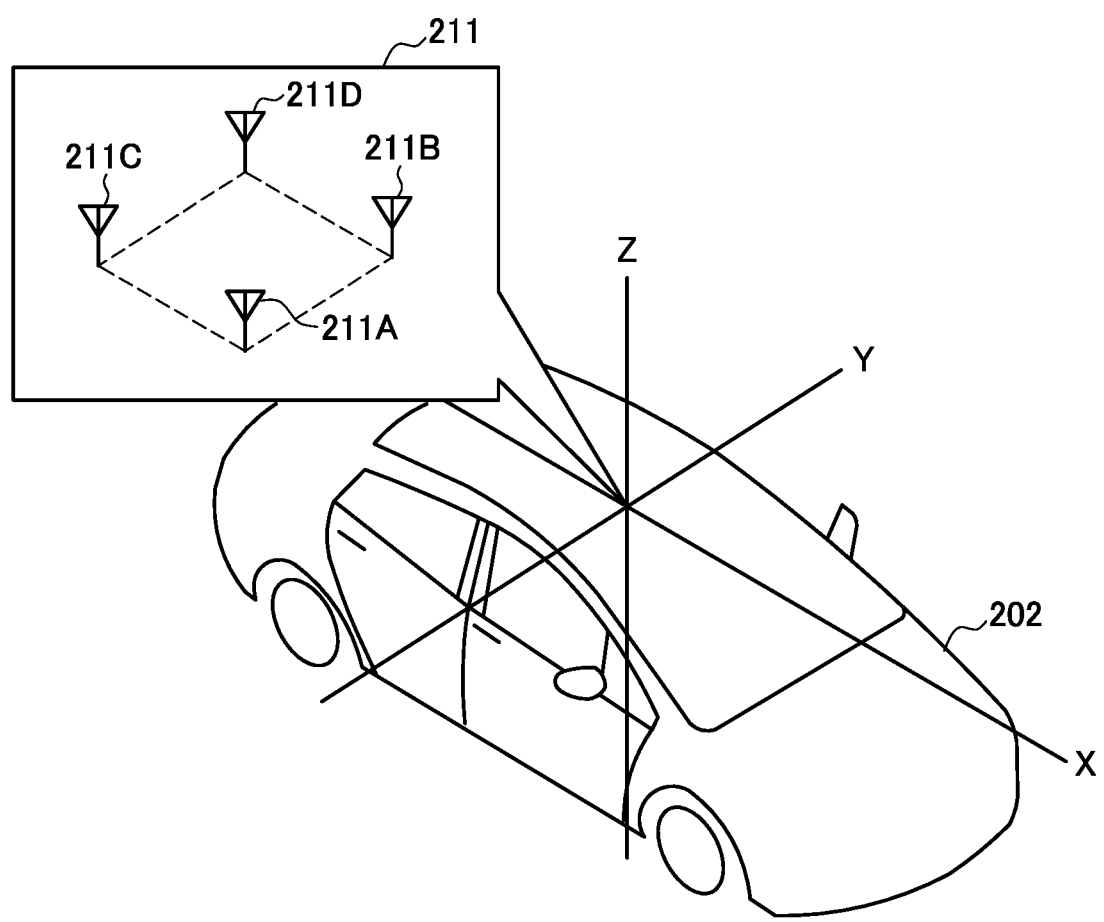
FIG. 2 is a diagram illustrating an example of arrangement of a plurality of antennas installed in a vehicle according to the embodiment.

FIG. 2 is a diagram illustrating an example of arrangement of the plurality of antennas 211 (wireless communication sections 210) installed in the vehicle 202 according to the present embodiment. As illustrated in FIG. 2, the four antennas 211 (211A to 211D) are installed on a ceiling of the vehicle 202. The antenna 211A is installed on a front right side of the vehicle 202. The antenna 211B is installed on a front left side of the vehicle 202. The antenna 211C is installed on a rear right side of the vehicle 202. The antenna 211D is installed on a rear left side of the vehicle 202. Note that, distances between adjacent antennas 211 are set to a half or less of wavelength $\lambda$ of a carrier wave of an angle estimation signal (to be described later). A local coordinate system of the communication unit 200 is set as a coordinate system based on the communication unit 200. An example of the local coordinate system of the communication unit 200 has its origin at the center of the four antennas 211. This local coordinate system has its X axis along a front-rear direction of the vehicle 202, its Y axis along a left-right direction of the vehicle 202, and its Z axis along an up-down direction of the vehicle 202. Note that, the X axis is parallel to a line connecting a pair of the antennas in the front-rear direction (such as a pair of the antenna 211A and the antenna 211C, and a pair of the antenna 211B and the antenna 211D). In addition, the Y axis is parallel to a line connecting a pair of the antennas in the left-right direction (such as a pair of the antenna 211A and the antenna 211B, and a pair of the antenna 211C and the antenna 211D).

Note that, the arrangement of the four antennas 211 is not limited to the square shape. The arrangement of the four antennas 211 may be a parallelogram shape, a trapezoid shape, a rectangular shape, or any other shapes. Of course, the number of antennas 211 is not limited to four.

Figure 3:
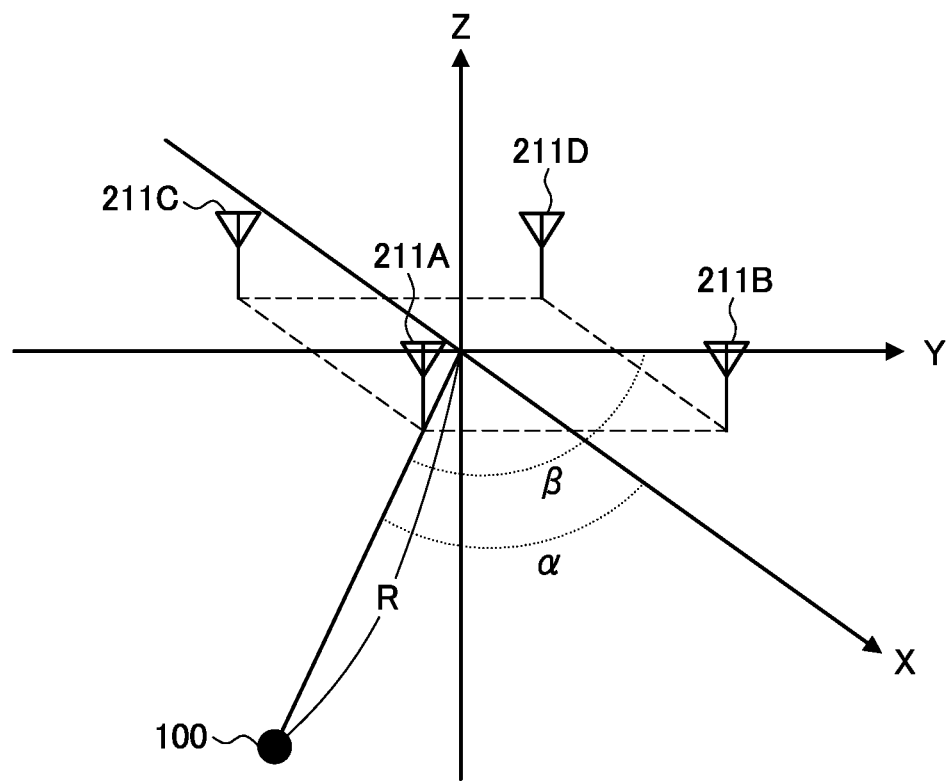
FIG. 3 is a diagram illustrating an example of a positional parameter of a portable device according to the embodiment.

FIG. 3 is a diagram illustrating an example of a positional parameter of the portable device 100 according to the present embodiment. The positional parameter may include a distance R between the portable device 100 and the communication unit 200. The distance R illustrated in FIG. 3 is a distance from the origin of the local coordinate system of the communication unit 200 to the portable device 100. The distance R is estimated on the basis of a result of transmission/reception of a ranging signal (to be described later) between the portable device 100 and one of the plurality of wireless communication sections 210. The distance R may be a distance between the portable device 100 and one of the wireless communication sections 210 that transmit/receive the ranging signal (to be described later).

In addition, as illustrated in FIG. 3, the positional parameter may include an angle of the portable device 100 based on the communication unit 200, the angle including an angle α between the X axis and the portable device 100 and an angle β between the Y axis and the portable device 100. The angles α and β are angles between the coordinate axes of a first predetermined coordinate system and a straight line connecting the portable device 100 with the origin of the first predetermined coordinate system. For example, the first predetermined coordinate system is the local coordinate system of the communication unit 200. The angle α is an angle between the X axis and the straight line connecting the portable device 100 with the origin. The angle β is an angle between the Y axis and the straight line connecting the portable device 100 with the origin.

Figure 4:
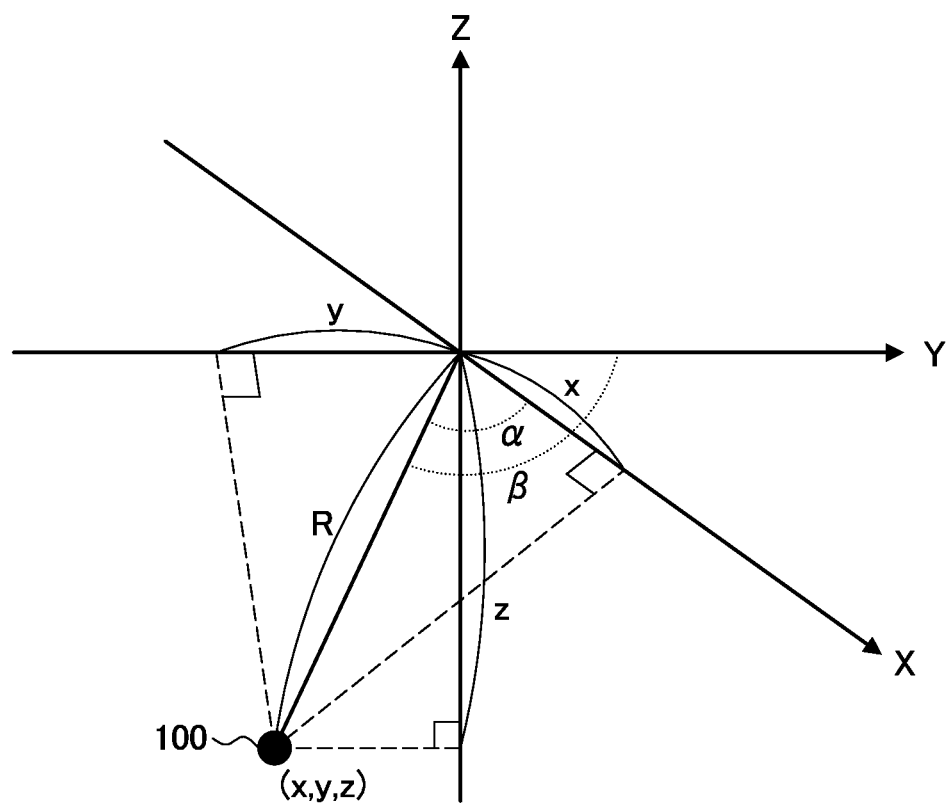
FIG. 4 is a diagram illustrating an example of a positional parameter of the portable device according to the embodiment.

FIG. 4 is a diagram illustrating an example of the positional parameter of the portable device 100 according to the present embodiment. The positional parameter may include coordinates of the portable device 100 in a second predetermined coordinate system. In FIG. 4, a coordinate x on the X axis, a coordinate y on the Y axis, and a coordinate z on the Z axis of the portable device 100 are an example of such coordinates. In other words, the second predetermined coordinate system may be the local coordinate system of the communication unit 200. Alternatively, the second predetermined coordinate system may be a global coordinate system.

<2.2. CIR>

(1) CIR Calculation Process

In the positional parameter estimation process, the portable device 100 and the communication unit 200 communicate with each other to estimate the positional parameter. At this time, the portable device 100 and the communication unit 200 calculates channel impulse responses (CIRs).

The CIR is a response obtained when an impulse is input to the system. In the case where a wireless communication section of one of the portable device 100 and the communication unit 200 (hereinafter, also referred to as a transmitter) transmits a signal including a pulse as a first signal, the CIR according to the present embodiment is calculated on the basis of a second signal that corresponds to the first signal and that is received by a wireless communication section of the other (hereinafter, also referred to as a receiver). The pulse is a signal including change in amplitude. It can be said that the CIR indicates characteristics of a wireless communication path between the portable device 100 and the communication unit 200. Hereinafter, the first signal is also referred to as a transmission signal, and the second signal is also referred to as a reception signal.

For example, the CIR may be a correlation computation result that is a result obtained by correlating the transmission signal with the reception signal at each delay time that is time elapsed after the transmitter transmits the transmission signal. Here, the correlation may be sliding correlation that is a process of correlating the transmission signal with the reception signal by shifting relative positions of the signals in a time direction. The correlation computation result includes a correlation value indicating a degree of the correlation between the transmission signal and the reception signal as an element obtained at each delay time. Each of a plurality of the elements included in the correlation computation result is information including a combination of the delay time and the correlation value. The correlation may be calculated at each delay time between designated intervals. In other words, the CIR may be a result of correlating the transmission signal with the reception signal at the designated interval after the transmitter transmits the transmission signal. Here, the designated interval is an interval between timings at which the receiver samples the reception signal, for example. Therefore, an element included in the CIR is also referred to as a sampling point. The correlation value may be a complex number including IQ components. In addition, the correlation value may be a phase or amplitude of the complex number. In addition, the correlation value may be electric power that is a sum of squares of an I component and a Q component of the complex number (or square of amplitude).

For another example, the CIR may be the reception signal itself (complex number including IQ components). Alternatively, the CIR may be a phase or amplitude of the reception signal. Alternatively, the CIR may be electric power that is a sum of squares of an I component and a Q component of the reception signal (or square of amplitude).

A value obtained at each delay time of the CIR is also referred to as a CIR value. In other words, the CIR is chronological change in the CIR value. In the case where the CIR is the correlation computation result, the CIR value is a correlation value obtained at each delay time. In the case where the CIR is the reception signal itself, the CIR value is the reception signal received at each delay time. In the case where the CIR is the phase or amplitude of the reception signal, the CIR value is the phase or amplitude of the reception signal received at each delay time. In the case where the CIR is the electric power of the reception signal, the CIR value is the electric power of the reception signal received at each delay time.

In the case where the CIR is the correlation computation result, the receiver calculates the CIR by correlating the transmission signal with the reception signal through the sliding correlation. For example, the receiver calculates a value obtained by correlating the reception signal with the transmission signal delayed by a certain delay time, as characteristics (that is, CIR value) obtained at the delay time. Next, the receiver calculates the CIR value at each delay time to calculate the CIR. Hereinafter, it is assumed that the CIR is the correlation computation result.

Note that, the CIR is also referred to as delay profile in a ranging technology using the UWB. In particular, the CIR using electric power as the CIR value is referred to as power delay profile.

Hereinafter, with reference to FIG. 5 to FIG. 6, a CIR calculation process performed in the case where the portable device 100 serves as the transmitter and the communication unit 200 serves as the receiver will be described in detail.

Figure 5:
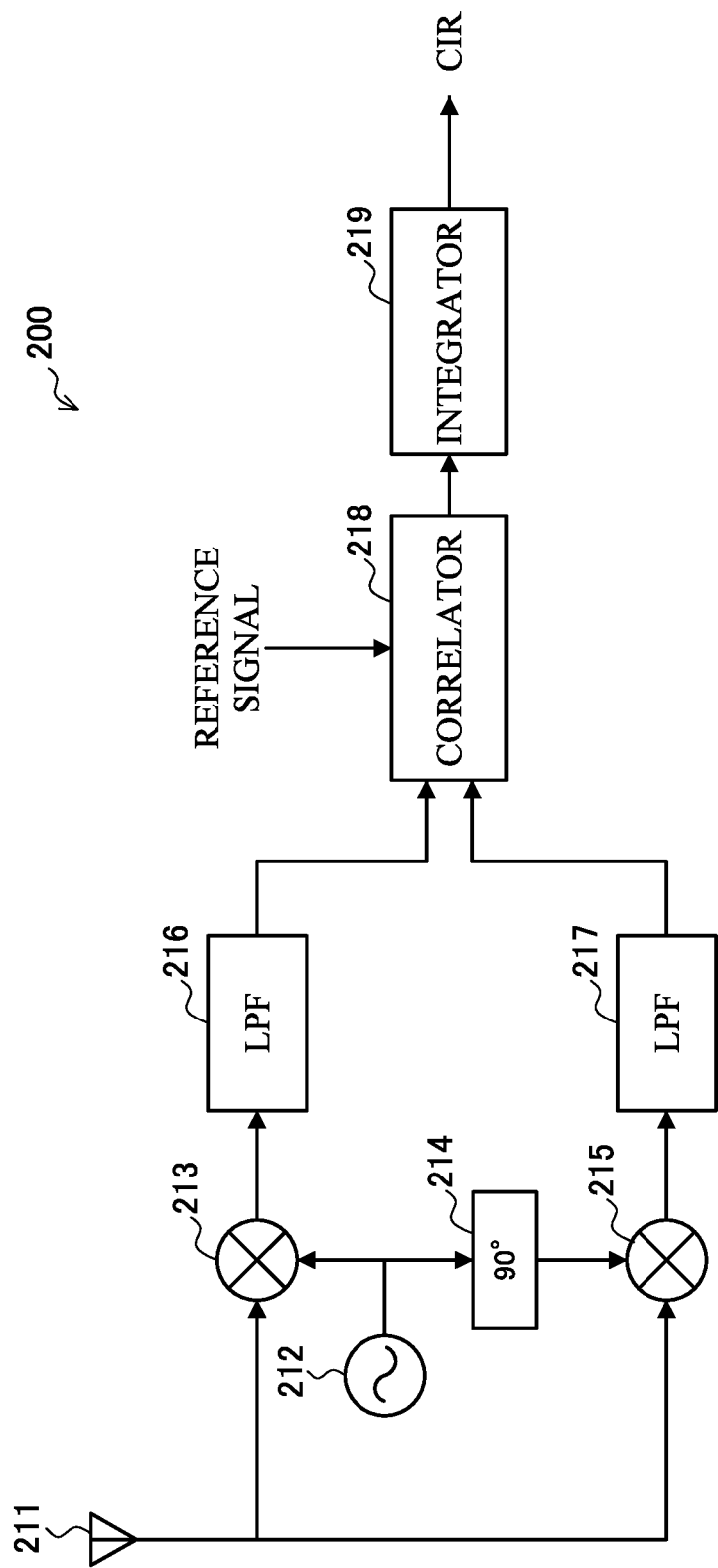
FIG. 5 is a diagram illustrating an example of processing blocks for signal processing in a communication unit according to the embodiment.

FIG. 5 is a diagram illustrating an example of processing blocks for signal processing in the communication unit 200 according to the present embodiment. As illustrated in FIG. 5, the communication unit 200 includes an oscillator 212, a multiplier 213, a 90-degree phase shifter 214, a multiplier 215, a low pass filter (LPF) 216, an LPF 217, a correlator 218, and an integrator 219.

The oscillator 212 generates a signal of same frequency as frequency of a carrier wave that carries a transmission signal, and outputs the generated signal to the multiplier 213 and the 90-degree phase shifter 214.

The multiplier 213 multiplies a reception signal received by the antenna 211 by the signal output from the oscillator 212, and outputs a result of the multiplication to the LPF 216. Among input signals, the LPF 216 outputs a signal of lower frequency than the frequency of the carrier wave that carries the transmission signal, to the correlator 218. The signal input to the correlator 218 is an I component (that is, a real part) among components corresponding to an envelope of the reception signal.

The 90-degree phase shifter 214 delays the phase of the input signal by 90 degrees, and outputs the delayed signal to the multiplier 215. The multiplier 215 multiplies the reception signal received by the antenna 211 by the signal output from the 90-degree phase shifter 214, and outputs a result of the multiplication to the LPF 217. Among input signals, the LPF 217 outputs a signal of lower frequency than the frequency of the carrier wave that carries the transmission signal, to the correlator 218. The signal input to the correlator 218 is a Q component (that is, an imaginary part) among the components corresponding to the envelope of the reception signal.

The correlator 218 calculates the CIR by correlating a reference signal with the reception signals including the I component and the Q component output from the LPF 216 and the LPF 217 through the sliding correlation. Note that, the reference signal described herein is the same signal as the transmission signal before multiplying the carrier wave.

The integrator 219 integrates the CIRs output from the correlator 218, and outputs the integrated CIRs.

Here, the transmitter may transmit a signal including a preamble as the transmission signal. The preamble is a sequence known to the transmitter and the receiver. Typically, the preamble is arranged at a head of the transmission signal. The preamble includes one or more preamble symbols. The preamble symbol is a pulse sequence including one or more pulses. The pulse sequence is a set of the plurality of pulses that are separate from each other in the time direction.

The preamble symbol is a target of integration performed by the integrator 219. Therefore, the correlator 218 calculates the CIR for each of the one or more preamble symbols by correlating a portion corresponding to a preamble symbol with a preamble symbol included in the transmission signal with regard to each of portions corresponding to the one or more preamble symbols included in the reception signal, at the designated intervals after the portable device 100 transmits the preamble symbol. Next, the integrator 219 obtains integrated CIRs by integrating the CIRs of the respective preamble symbols with regard to the one or more preamble symbols included in the preamble. Next, the integrator 219 outputs the integrated CIRs. Hereinafter, the CIR means the integrated CIRs unless otherwise noted.

As described above, the CIR includes a correlation value indicating a degree of the correlation between the transmission signal and the reception signal as an element obtained at each delay time, which is time elapsed after the transmitter transmits the transmission signal. From a viewpoint of the preamble symbol, the CIR includes the correlation value indicating a degree of the correlation between the transmission signal and the reception signal as an element obtained at each delay time, which is time elapsed after the transmitter transmits each preamble symbol.

(2) Example of CIR

Figure 6:
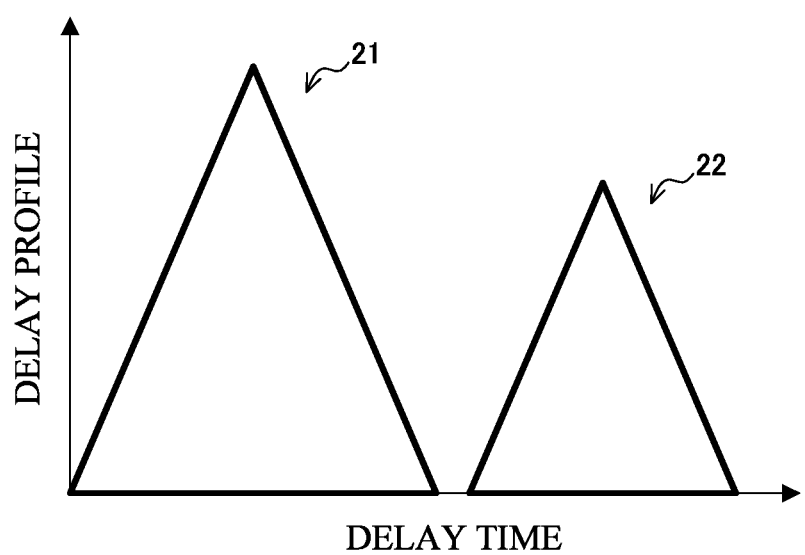
FIG. 6 is a graph illustrating an example of a CIR according to the embodiment.

FIG. 6 illustrates an example of the CIR output from the integrator 219. FIG. 6 is a graph illustrating the example of the CIR according to the present embodiment. The graph includes a horizontal axis representing delay time. The graph includes a vertical axis representing absolute values of CIR values (such as amplitude or electric power). Note that, the shape of CIR, more specifically, the shape of chronological change in the CIR value may also be referred to as a CIR waveform. Typically, a set of elements obtained between a zero-crossing and another zero-crossing corresponds to a single pulse with regard to the CIR. The zero-crossings are elements whose value is zero. However, the same does not apply to an environment with noise. For example, a set of elements obtained between intersections of a standard with chronological change in the CIR value may be treated as corresponding to the single pulse. The CIR illustrated in FIG. 6 includes a set 21 of elements corresponding to a certain pulse, and a set 22 of elements corresponding to another pulse.

For example, the set 21 corresponds to a signal (such as pulse) that reaches the receiver through a first path. The first path is a shortest path between the transmitter and the receiver. In an environment that includes no obstacle, the first path is a straight path between the transmitter and the receiver. For example, the set 22 corresponds to a signal (such as pulse) that reaches the receiver through a path other than the first path. As described above, the signals that have passed through different paths are also referred to as multipath waves.

(3) Detection of First Incoming Wave

Among wireless signals received from the transmitter, the receiver detects a signal that meets a predetermined detection standard as a signal that reaches the receiver through the first path. Next, the receiver estimates the positional parameter on the basis of the detected signal.

Hereinafter, the signal detected as the signal that reaches the receiver through the first path is also referred to as the first incoming wave. The first incoming wave may be any of a direct wave, a delayed wave, or a combined wave. The direct wave is a signal that passes through a shortest path between the transmitter and the receiver, and is received by the receiver. In other words, the direct wave is a signal that reaches the receiver through the first path. The delayed wave is a signal that passes through a path different from the shortest path between the transmitter and the receiver, that is, through a path other than the first path, and reaches the receiver. The delayed wave is received by the receiver after getting delayed in comparison with the direct wave. The combined wave is a signal received by the receiver in a state of combining a plurality of signals that have passed through a plurality of different paths.

The receiver detects the signal that meets the predetermined detection standard as the first incoming wave, among the received wireless signals. For example, the predetermined detection standard is a condition that the CIR value (such as amplitude or electric power) exceeds a predetermined threshold for the first time. In other words, the receiver may detect a pulse corresponding to a portion of the CIR obtained when the CIR value exceeds the predetermined threshold for the first time, as the first incoming wave.

Here, it should be noted that the signal detected as the first incoming wave is not necessarily the direct wave. For example, if the direct wave is received in a state where the direct wave and the delayed wave annihilate each other, sometimes the CIR value falls below the predetermined threshold and the direct wave is not detected as the first incoming wave. In this case, the combined wave or the delayed wave coming while being delayed behind the direct wave is detected as the first incoming wave.

Hereinafter, the predetermined threshold used for detecting the first incoming wave is also referred to as a first path threshold.

Reception Time of First Incoming Wave

The receiver may treat the time of meeting the predetermined detection standard as reception time of the first incoming wave. For example, the reception time of the first incoming wave is time corresponding to delayed time of an element having a CIR value that exceeds the first path threshold for the first time.

Alternatively, the receiver may treat time of obtaining a peak of the detected first incoming wave as the reception time of the first incoming wave. In this case, for example, the reception time of the first incoming wave is time corresponding to delayed time of an element having highest amplitude or electric power as the CIR value, among the set of elements corresponding to the first incoming wave with regard to the CIR.

Hereinafter, it is assumed that the reception time of the first incoming wave is time corresponding to delayed time of an element having a CIR value that exceeds the first path threshold for the first time.

Phase of First Incoming Wave

The receiver may treat a phase obtained at time of meeting the predetermined detection standard as a phase of the first incoming wave. For example, the phase of the first incoming wave is a phase serving as a CIR value of an element having the CIR value that exceeds the first path threshold for the first time.

Alternatively, the receiver may treat a phase of the peak of the detected first incoming wave as the phase of the first incoming wave. In this case, for example, the reception time of the first incoming wave is the phase serving as a CIR value of an element having highest amplitude or electric power as the CIR value, among the set of elements corresponding to the first incoming wave with regard to the CIR.

Hereinafter, it is assumed that the phase of the first incoming wave is a phase serving as a CIR value of an element having the CIR value that exceeds the first path threshold for the first time.

Width of First Incoming Wave

The width of the set of elements corresponding to the first incoming wave in the time direction is also referred to as the width of the first incoming wave. For example, the width of the first incoming wave is the width between a zero-crossing and another zero-crossing of the CIR in the time direction. For another example, the width of the first incoming wave is width between intersections of a standard with chronological change in the CIR value in the time direction.

The width of a pulse included in the transmission signal in the time direction is also referred to as the width of the pulse. For example, the width of the pulse is the width between a zero-crossing and another zero-crossing of chronological change in the CIR value in the time direction. For another example, the width of the pulse is width between intersections of a standard with chronological change in the CIR value in the time direction.

In the case where only the direct wave is detected as the first incoming wave, the first incoming wave of the CIR has an ideal width. The ideal width obtained when only the direct wave is detected as the first incoming wave can be calculated through theoretical calculation using the waveform of the transmission signal, a reception signal processing method, and the like. On the other hand, in the case where the combined wave is received as the first incoming wave, the width of the first incoming wave of the CIR may be different from the ideal width. For example, in the case where a combined wave obtained by combining a direct wave and a delayed wave having a same phase as the direct wave is detected as the first incoming wave, a portion corresponding to the direct wave and a portion corresponding to the delayed wave are added in a state where they are shifted in the time direction. Therefore, the portions reinforce each other, and the first incoming wave in the CIR has a wider width. On the other hand, in the case where a combined wave obtained by combining a direct wave and a delayed wave having an opposite phase from the direct wave is detected as the first incoming wave, the direct wave and the delayed wave annihilate each other. Therefore, the first incoming wave in the CIR has a narrower width.

<2.3. Estimation of Positional Parameter>

(1) Ranging

The communication unit 200 performs the ranging process. The ranging process is a process of estimating a distance between the communication unit 200 and the portable device 100. For example, the distance between the communication unit 200 and the portable device 100 is the distance R illustrated in FIG. 3. The ranging process includes transmission/reception of a ranging signal and calculation of the distance R based on propagation delay time of the ranging signal. The ranging signal is a signal used for ranging among signals transmitted/received between the portable device 100 and the communication unit 200. The propagation delay time is time from transmission to reception of the signal.

Here, the ranging signal is transmitted/received by one of the plurality of wireless communication sections 210 of the communication unit 200. Hereinafter, the wireless communication section 210 that transmits/receives the ranging signal is also referred to as a master. The distance R is a distance between the wireless communication section 210 serving as the master (more precisely, the antenna 211) and the portable device 100 (more precisely, the antenna 111). In addition, the wireless communication sections 210 other than the wireless communication section 210 that transmits/receives the ranging signal are also referred to as slaves.

In the ranging process, a plurality of the ranging signals may be transmitted and received between communication unit 200 and the portable device 100. Among the plurality of ranging signals, a ranging signal transmitted from one device to the other device is also referred to as a first ranging signal. Next, a ranging signal transmitted as a response to the first ranging signal from the device that has received the first ranging signal to the device that has transmitted the first ranging signal is also referred to as a second ranging signal. In addition, a ranging signal transmitted as a response to the second ranging signal from the device that has received the second ranging signal to the device that has transmitted the second ranging signal is also referred to as a third ranging signal.

Next, with reference to FIG. 7, an example of a flow of the ranging process will be described.

Figure 7:
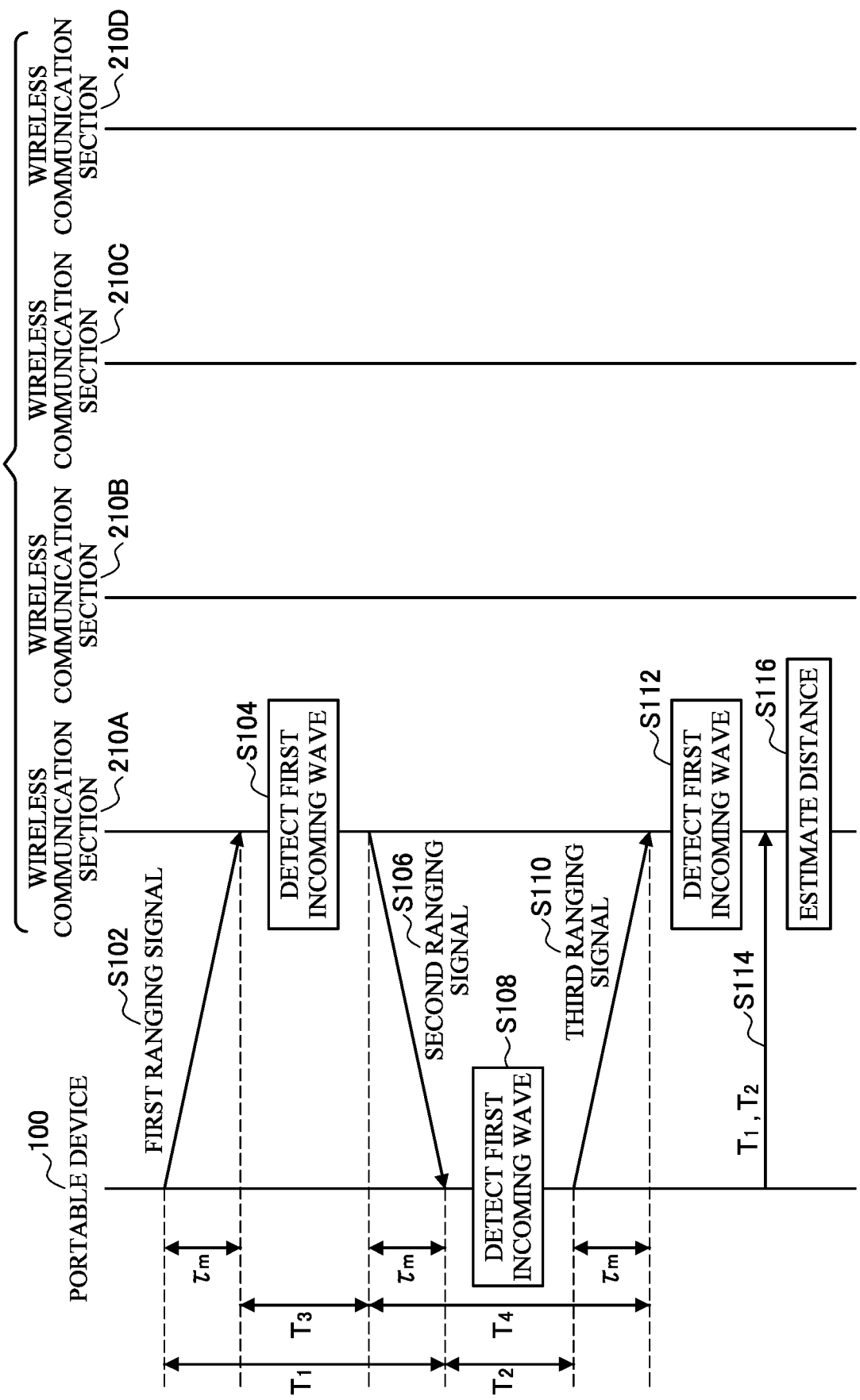
FIG. 7 is a sequence diagram illustrating an example of a flow of a ranging process executed by the system according to the embodiment.

FIG. 7 is a sequence diagram illustrating the example of the flow of the ranging process executed in the system 1 according to the present embodiment. The portable device 100 and the communication unit 200 are involved in this sequence. It is assumed that the wireless communication section 210A functions as the master in this sequence.

As illustrated in FIG. 7, the portable device 100 first transmits the first ranging signal (Step S102). When the wireless communication section 210A receives the first ranging signal, the control section 230 calculates a CIR of the first ranging signal. Next, the control section 230 detects a first incoming wave of the first ranging signal of the wireless communication section 210A on the basis of the calculated CIR (Step S104).

Next, the wireless communication section 210A transmits the second ranging signal in response to the first ranging signal (Step S106). When the second ranging signal is received, the portable device 100 calculates a CIR of the second ranging signal. Next, the portable device 100 detects a first incoming wave of the second ranging signal on the basis of the calculated CIR (Step S108).

Next, the portable device 100 transmits the third ranging signal in response to the second ranging signal (Step S110). When the wireless communication section 210A receives the third ranging signal, the control section 230 calculates a CIR of the third ranging signal. Next, the control section 230 detects a first incoming wave of the third ranging signal of the wireless communication section 210A on the basis of the calculated CIR (Step S112).

The portable device 100 measures a time period $T_1$ from transmission time of the first ranging signal to reception time of the second ranging signal, and a time period $T_2$ from reception time of the second ranging signal to transmission time of the third ranging signal. Here, the reception time of the second ranging signal is reception time of the first incoming wave of the second ranging signal detected in Step S108. Next, the portable device 100 transmits a signal including information indicating the time period $T_1$ and the time period $T_2$ (Step S114). For example, such a signal is received by the wireless communication section 210A.

The control section 230 measures a time period $T_3$ from reception time of the first ranging signal to transmission time of the second ranging signal, and a time period $T_4$ from transmission time of the second ranging signal to reception time of the third ranging signal. Here, the reception time of the first ranging signal is reception time of the first incoming wave of the first ranging signal detected in Step S104. In a similar way, the reception time of the third ranging signal is reception time of the first incoming wave of the third ranging signal detected in Step S112.

Next, the control section 230 estimates the distance R on the basis of the time periods $T_1$, $T_2$, $T_3$, and $T_4$ (Step S116). For example, the control section 230 estimates propagation delay time $\tau_m$ by using an equation listed below.

$$\tau_m = \frac{T_1 \times T_4 - T_2 \times T_3}{T_1 + T_2 + T_3 + T_4} \tag{1}$$

Next, the control section 230 estimates the distance R by multiplying the estimated propagation delay time $\tau_m$ by speed of the signal.

Cause of Reduction in Accuracy of Estimation

The reception times of the ranging signals serving as start or end of the time periods $T_1$, $T_2$, $T_3$, and $T_4$ are reception times of the first incoming waves of the ranging signals. As described above, the signals detected as the first incoming wave are not necessarily the direct waves.

In the case where the combined wave or the delayed wave coming while being delayed behind the direct wave is detected as the first incoming wave, reception time of the first incoming wave varies in comparison with the case where the direct wave is detected as the first incoming wave. In this case, an estimation result of the propagation delay time $\tau_m$ is changed from a true value (an estimation result obtained in the case where the direct wave is detected as the first incoming wave). In addition, this change deteriorates accuracy of estimating the distance R (hereinafter, also referred to as ranging accuracy).

(2) Angle Estimation

The communication unit 200 performs the angle estimation process. The angle estimation process is a process of estimating the angles α and β illustrated in FIG. 3. An angle acquisition process includes reception of an angle estimation signal and calculation of the angles α and β on the basis of a result of reception of the angle estimation signal. The angle estimation signal is a signal used for estimating an angle among signals transmitted/received between the portable device 100 and the communication unit 200. Next, with reference to FIG. 8, an example of a flow of the angle estimation process will be described.

Figure 8:
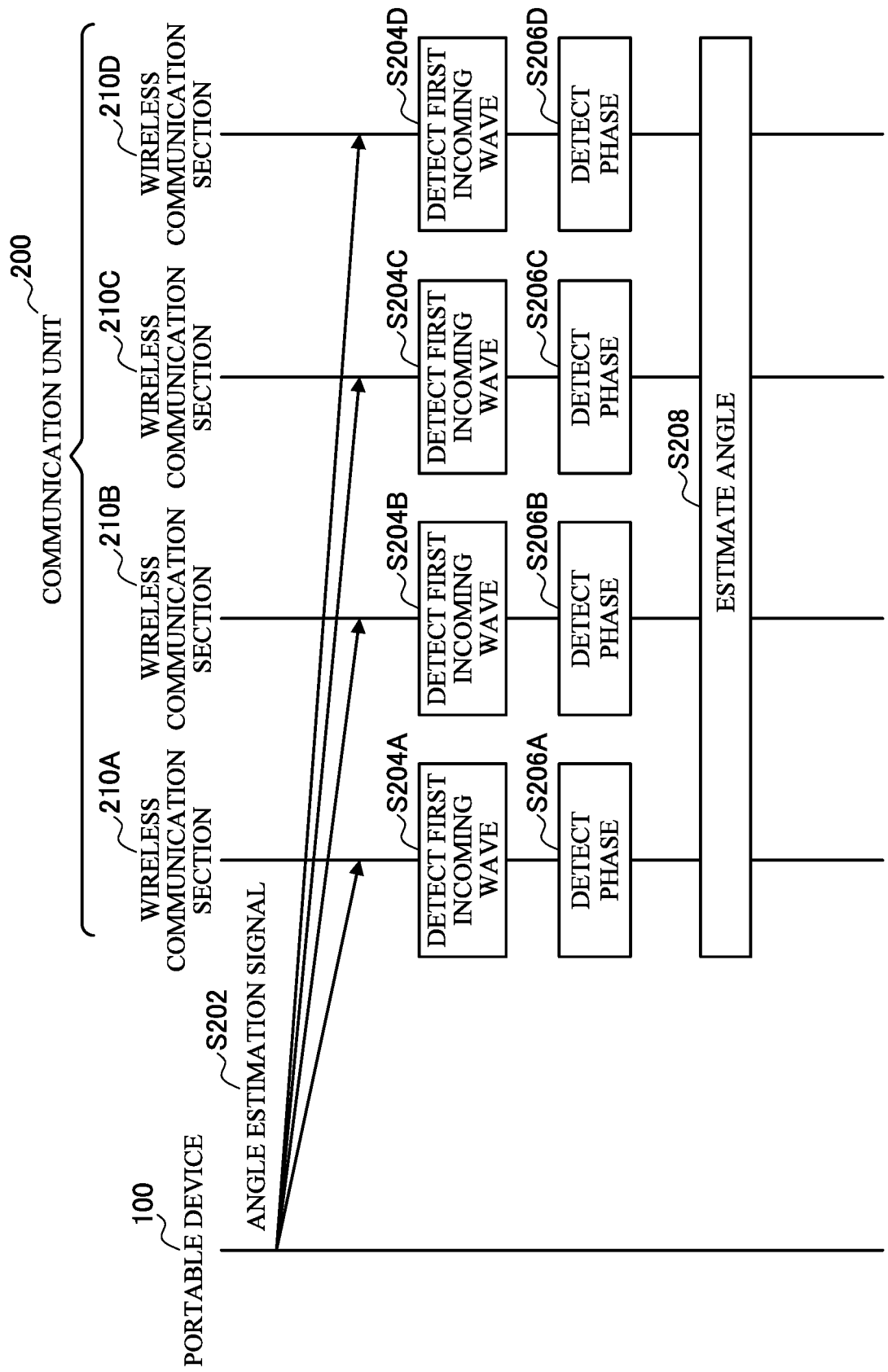
FIG. 8 is a sequence diagram illustrating an example of a flow of an angle estimation process executed by the system according to the embodiment.

FIG. 8 is a sequence diagram illustrating the example of the flow of the angle estimation process executed in the system 1 according to the present embodiment. The portable device 100 and the communication unit 200 are involved in this sequence.

As illustrated in FIG. 8, the portable device 100 first transmits the angle estimation signals (Step S202). Next, when the wireless communication sections 210A to 210D receive respective angle estimation signals, the control section 230 calculates CIRs of the respective angle estimation signals received by the wireless communication sections 210A to 210D. Next, the control section 230 detects first incoming waves of the respective angle estimation signals on the basis of the calculated CIRs with regard to the wireless communication sections 210A to 210D (Step S204A to Step S204D). Next, the control section 230 detects respective phases of the detected first incoming waves with regard to the wireless communication sections 210A to 210D (Step S206A to Step S206D). Next, the control section 230 estimates the angles α and β on the basis of the respective phases of the detected first incoming waves with regard to the wireless communication sections 210A to 210D (Step S208).

Next, details of the process in Step S208 will be described. $P_A$ represents the phase of the first incoming wave detected with regard to the wireless communication section 210A. $P_B$ represents the phase of the first incoming wave detected with regard to the wireless communication section 210B. $P_C$ represents the phase of the first incoming wave detected with regard to the wireless communication section 210C. $P_D$ represents the phase of the first incoming wave detected with regard to the wireless communication section 210D. In this case, antenna array phase differences $Pd_{AC}$ and $Pd_{BD}$ in the X axis direction and antenna array phase differences $Pd_{BA}$ and $Pd_{DC}$ in the Y axis direction are expressed in respective equations listed below.

$$Pd_{AC}=(P_A-P_C)$$

$$Pd_{BD}=(P_B-P_D)$$

$$Pd_{DC}=(P_D-P_C)$$

$$Pd_{BA}=(P_B-P_A) \qquad (2)$$

The angles α and β are calculated by using the following equation. Here, λ represents wavelength of a carrier wave of the angle estimation signal, and d represents a distance between the antennas 211.

$$\alpha \text{ or } \beta = \arccos(\lambda \cdot Pd/(2 \cdot \pi \cdot d)) \qquad (3)$$

Therefore, respective equations listed below represent angles calculated on the basis of the respective antenna array phase differences.

$$\alpha_{AC}=\arccos(\lambda \cdot Pd_{AC}/(2 \cdot \pi \cdot d))$$

$$\alpha_{BD}=\arccos(\lambda \cdot Pd_{BD}/(2 \cdot \pi \cdot d))$$

$$\beta_{DC}=\arccos(\lambda \cdot Pd_{DC}/(2 \cdot \pi \cdot d))$$

$$\beta_{BA}=\arccos(\lambda \cdot Pd_{BA}/(2 \cdot \pi \cdot d)) \qquad (4)$$

The control section 230 calculates the angles α and β on the basis of the calculated angles $\alpha_{AC}$, $\alpha_{BD}$, $\beta_{DC}$, and $\beta_{BA}$. For example, as expressed in the following equations, the control section 230 calculates the angles α and β by averaging the angles calculated with regard to the two respective arrays in the X axis direction and the Y axis direction.

$$\alpha=(\alpha_{AC}+\alpha_{BD})/2$$

$$\beta=(\beta_{DC}+\beta_{BA})/2 \qquad (5)$$

Cause of Reduction in Accuracy of Estimation

As described above, the angles α and β are calculated on the basis of the phases of the first incoming waves. As described above, the signals detected as the first incoming waves are not necessarily the direct waves.

In other words, sometimes the delayed wave or the combined wave may be detected as the first incoming wave. Typically, phases of the delayed wave and the combined wave are different from the phase of the direct wave. This difference deteriorates accuracy of angle estimation.

Supplement

Note that, the angle estimation signal may be transmitted/received during the angle estimation process, or at any other timings. For example, the angle estimation signal may be transmitted/received during the ranging process. Specifically, the third ranging signal illustrated in FIG. 7 may be the same as the angle estimation signal illustrated in FIG. 8. In this case, it is possible for the communication unit 200 to calculate the distance R, the angle α, and the angle β by receiving a single wireless signal that serves as both the angle estimation signal and the third ranging signal.

(3) Coordinate Estimation

The control section 230 performs a coordinate estimation process. The coordinate estimation process is a process of estimating three-dimensional coordinates (x, y, z) of the portable device 100 illustrated in FIG. 4. As the coordinate estimation process, a first calculation method and a second calculation method listed below may be adopted.

First Calculation Method

The first calculation method is a method of calculating the coordinates x, y, and z on the basis of results of the ranging process and the angle estimation process. In this case, the control section 230 first calculates the coordinates x and y by using equations listed below.

$$x=R \cdot \cos \alpha$$

$$y=R \cdot \cos \beta \qquad (6)$$

Here, the distance R, the coordinate x, the coordinate y, and the coordinate z have a relation represented by an equation listed below.

$$R=\sqrt{x^2+y^2+z^2} \qquad (7)$$

The control section 230 calculates the coordinate z by using the above-described relation and an equation listed below.

$$z=\sqrt{R^2-R^2 \cdot \cos^2 \alpha - R \cdot \cos^2 \beta} \qquad (8)$$

Second Calculation Method

The second calculation method is a method of calculating the coordinates x, y, and z while omitting estimation of the angles α and β. First, the above-listed equations (4), (5), (6), and (7) establish a relation represented by equations listed below.

$$x/R=\cos \alpha \qquad (9)$$

$$y/R=\cos \beta \qquad (10)$$

$$x^2+y^2+z^2=R^2 \qquad (11)$$

$$d \cdot \cos \alpha = \lambda \cdot (Pd_{AC}/2+Pd_{BD}/2)/(2 \cdot \pi) \qquad (12)$$

$$d \cdot \cos \beta = \lambda \cdot (Pd_{DC}/2+Pd_{BA}/2)/(2 \cdot \pi) \qquad (13)$$

The equation (12) is rearranged for cos α, and cos α is substituted into the equation (9). This makes it possible to obtain the coordinate x by using an equation listed below.

$$x=R \cdot \lambda \cdot (Pd_{AC}/2+Pd_{BD}/2)/(2 \cdot \pi \cdot d) \qquad (14)$$

The equation (13) is rearranged for cos β, and cos β is substituted into the equation (10). This makes it possible to obtain the coordinate y by using an equation listed below.

$$y=R \cdot \lambda \cdot (Pd_{DC}/2+Pd_{BA}/2)/(2 \cdot \pi \cdot d) \qquad (15)$$

Next, the equation (14) and the equation (15) are substituted into the equation (11), and the equation (11) is rearranged. This makes it possible to obtain the coordinate z by using an equation listed below.

$$z=\sqrt{R^2-x^2-y^2} \qquad (16)$$

The process of estimating the coordinates of the portable device 100 in the local coordinate system has been described above. It is also possible to estimate coordinates of the portable device 100 in the global coordinate system by combining the coordinates of the portable device 100 in the local coordinate system and coordinates of the origin of the local coordinate system relative to the global coordinate system.

Cause of Reduction in Accuracy of Estimation

As described above, the coordinates are calculated on the basis of the propagation delay time and phases. In addition, they are estimated on the basis of the first incoming waves. Therefore, accuracy of estimating the coordinates may deteriorate in a way similar to the ranging process and the angle estimation process.

(4) Estimation of Existence Region

The positional parameter may include a region including the portable device 100 among a plurality of predefined regions. For example, in the case where the region is defined by a distance from the communication unit 200, the control section 230 estimates the region including the portable device 100 on the basis of the distance R estimated through the ranging process. For another example, in the case where the region is defined by an angle with respect to the communication unit 200, the control section 230 estimates the region including the portable device 100 on the basis of the angles α and β estimated through the angle estimation process. For another example, in the case where the region is defined by the three-dimensional coordinates, the control section 230 estimates the region including the portable device 100 on the basis of the coordinates (x, y, z) estimated through the coordinate estimation process.

Alternatively, in a process specific to the vehicle 202, the control section 230 may estimate the region including the portable device 100 among the plurality of regions including the vehicle interior and the vehicle exterior of the vehicle 202. This makes it possible to provide courteous service such as providing different serves in the case where the user is in the vehicle interior and in the case where the user is in the vehicle exterior. In addition, the control section 230 may estimate the region including the portable device 100 among nearby region and faraway region. The nearby region is a region within a predetermined distance from the vehicle 202, and the faraway region is the predetermined distance or more away from the vehicle 202.

(5) Use of Result of Estimating Positional Parameter

For example, a result of estimating the positional parameter may be used for authentication of the portable device 100. For example, the control section 230 determines that the authentication is successful and unlock a door in the case where the portable device 100 is in a region close to the communication unit 200 on a driver seat side.

3. Technical Problem

The plurality of wireless communication sections 210 may include both a wireless communication section 210 in a line-of-sight (LOS) condition and a wireless communication section 210 in a non-line-of-sight (NLOS) condition.

The LOS condition means that the antenna 111 of the portable device 100 and the antenna 211 of the wireless communication section 210 are visible from each other. In the case of the LOS condition, a highest reception electric power of the direct wave is obtained. Therefore, there is a high possibility that the receiver succeeds in detecting the direct wave as the first incoming wave.

The NLOS condition means that the antenna 111 of the portable device 100 and the antenna 211 of the wireless communication section 210 are not visible from each other. In the case of the NLOS condition, reception electric power of the direct wave may become lower than the others. Therefore, there is a possibility that the receiver fails in detecting the direct wave as the first incoming wave.

In the case where the wireless communication section 210 is in the NLOS condition, reception electric power of the direct wave is smaller than noise among signals came from the portable device 100. Accordingly, even if detection of the direct wave as the first incoming wave is successful, the phase and reception time of the first incoming wave may be changed due to an effect of the noise. In this case, accuracy of ranging and accuracy of angle estimation deteriorate.

In addition, in the case where the wireless communication section 210 is in the NLOS condition, reception electric power of the direct wave becomes lower than the case where the wireless communication section 210 is in the LOS condition, and detection of the direct wave as the first incoming wave may end in failure. In this case, accuracy of ranging and accuracy of angle estimation deteriorate.

Therefore, according to the present embodiment, there is provided the technology that makes it possible to improve the accuracy of estimating the positional parameter by estimating the positional parameter on the basis of a first incoming wave in the case where there is a high possibility that the direct wave is successfully detected as the first incoming wave.

4. Technical Features (1) Overview

The control section 230 detects a specific element on the basis of a first threshold with regard to each of CIRs respectively obtained from the plurality of wireless communication sections 210. The specific element is one or more of a plurality of elements included in the CIR. Specifically, to detect the specific element on the basis of the first threshold, the control section 230 detects one or more element whose amplitude component included in the CIR value exceeds the first threshold, as the specific element. The amplitude component included in the CIR value may be amplitude itself or electric power obtained by squaring the amplitude.

The specific element is an element corresponding to the first incoming wave. Time corresponding to delay time of the specific element serves as time of receiving the first incoming wave and is used for ranging. In addition, the phase of the specific element serves as the phase of the first incoming wave and is used for angle estimation. In other words, the control section 230 detects the specific element to be used for the positional parameter estimation with regard to the plurality of wireless communication sections 210.

For example, to detect the specific element on the basis of the first threshold, the control section 230 detects an element having amplitude or electric power that exceeds the first threshold for the first time, as the specific element. The amplitude or electric power serves as the CIR value. In this case, the specific elements are detected one by one with regard to the plurality of CIR s obtained with regard to the plurality of wireless communication sections 210. The first threshold is the above-described first path threshold. In other words, the specific element is an element whose CIR value exceeds the first path threshold for the first time, among the plurality of elements included in the CIR. This makes it possible to reduce computational load for detecting the specific elements in comparison with the case of detecting the plurality of specific elements from a single CIR.

The control section 230 calculates the reliability parameter. The reliability parameter is an indicator indicating whether the detected specific element is appropriate for a processing target. More specifically, the reliability parameter is an indicator indicating whether it is appropriate to use the detected specific element for estimating the positional parameter. When mention is made of a plurality of the specific elements detected with regard to the respective wireless communication sections 210, the reliability parameter is an indicator indicating whether each of the detected specific elements is appropriate for the processing target.

When the specific element is appropriate for the processing target, the specific element corresponds to a direct wave. On the other hand, when the specific element is inappropriate for the processing target, the specific element does not correspond to the direct wave. In other words, the reliability parameter can be treated as an indicator that indicates suitability of the detected specific element for an element corresponding to the direct wave. In the case where the detected specific element corresponds to a delayed wave or a combined wave, that is, in the case where the delayed wave or the combined wave is detected as the first incoming wave, the accuracy of estimating the positional parameter deteriorates as described above. Therefore, it is possible to evaluate the accuracy of estimating the positional parameter on the basis of the reliability parameter.

For example, the reliability parameters are continuous values or discrete values. As the reliability parameter has a higher value, the reliability parameter may indicate that the specific element is appropriate for the processing target. In a similar way, if the reliability parameter has a lower value, the reliability parameter may indicate that the specific element is inappropriate for the processing target, and vice versa. Hereinafter, a degree of appropriateness of the specific element as the processing target may also be referred to as reliability. In addition, high reliability means that the specific element is appropriate for the processing target, and low reliability means that the specific element is inappropriate as the processing target.

The control section 230 detects the specific elements and calculates the reliability parameters on the basis of the transmission signal transmitted from the portable device 100 in the positional parameter estimation process and the respective reception signal obtained when the plurality of wireless communication sections 210 receive the transmission signal. Such a transmission signal may be the ranging signal or the angle estimation signal. For example, such a transmission signal may be a signal that is the third ranging signal illustrated in FIG. 7 and that also serves as the angle estimation signal.

Details of a method of calculating the reliability parameter will be described later.

The control section 230 controls a positional parameter determination process on the basis of the reliability parameter. The positional parameter determination process is a process of estimating a positional parameter indicating a position of the portable device 100 on the basis of the detected specific element. Specifically, the control section 230 selects a specific element corresponding to a reliability parameter with the highest reliability, or a reliability parameter indicating reliability that exceeds a predetermined threshold. Next, the control section 230 estimates a positional parameter on the basis of the selected specific element.

For example, the control section 230 performs ranging on the basis of delay time of the selected specific element. For another example, the control section 230 estimates an angle on the basis of the phase of the selected specific element. For another example, the control section 230 estimates coordinates on the basis of the phase and the delay time of the selected specific element. Anyway, it is possible to estimate the positional parameter on the basis of the specific element with high reliability. This makes it possible to improve accuracy of estimating the positional parameter. Note that, details of a process of controlling the positional parameter estimation process on the basis of the reliability parameter will be described later.

(2) Reliability Parameter

First Reliability Parameter

The reliability parameter may include a first reliability parameter that is a difference between delay time of a first element and delay time of a second element of the CIR. The first element has a peak CIR value for the first time after the specific element, and the second element has the peak CIR value for the second time after the specific element. Details of the first reliability parameter will be described with reference to FIG. 9 and FIG. 10.

Figure 9:
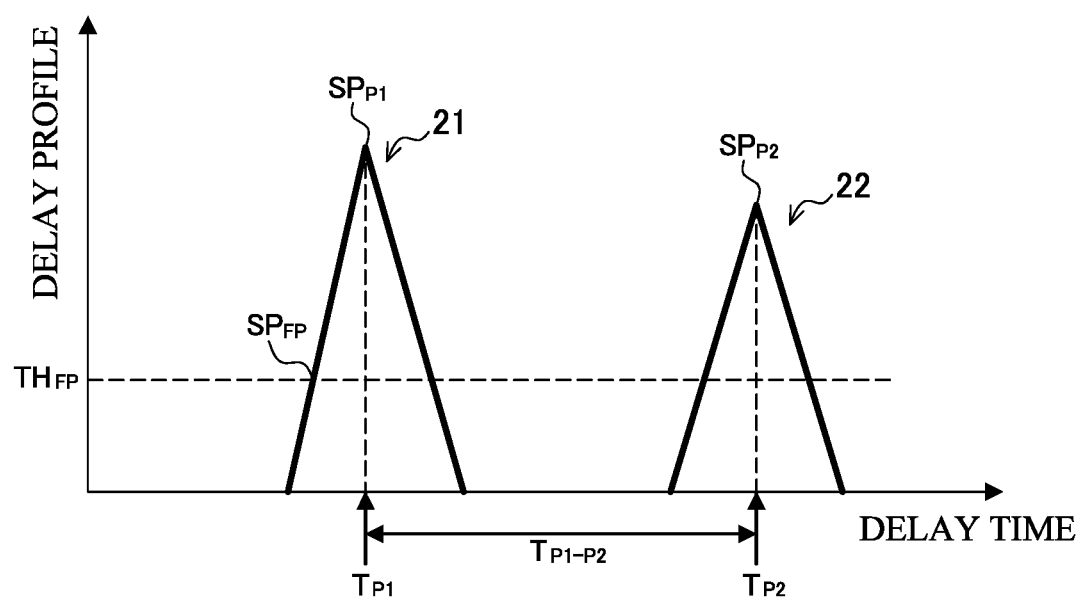
FIG. 9 is a graph illustrating an example of a CIR.
Figure 10:
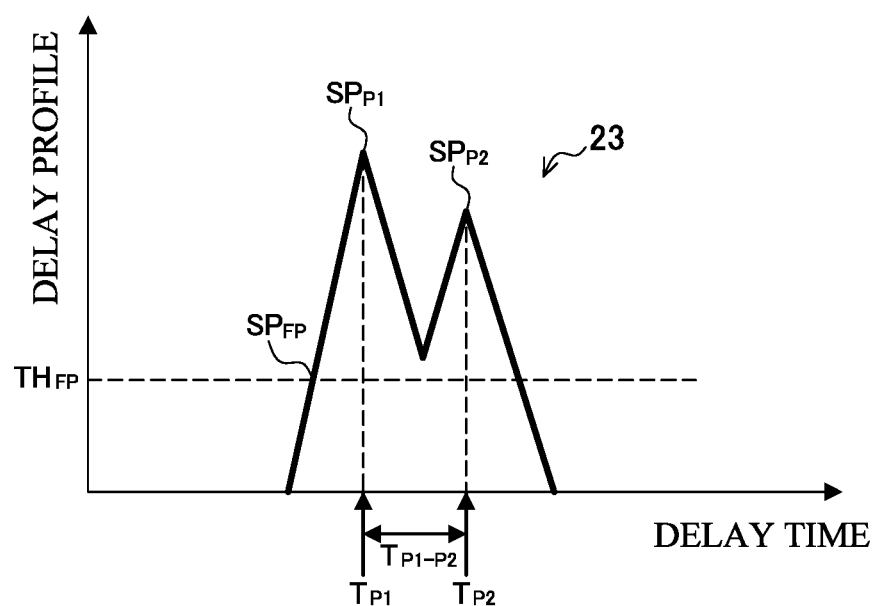
FIG. 10 is a graph illustrating an example of a CIR.

FIG. 9 and FIG. 10 are graphs illustrating examples of the CIR s. The graph includes a horizontal axis representing delay time. The graph includes a vertical axis representing absolute values of CIR values (such as electric power or amplitude).

The CIR illustrated in FIG. 9 include a set 21 of elements corresponding to the direct wave, and a set 22 of elements corresponding to the delayed wave. The set 21 includes a specific element $SP_{FP}$ that is an element whose CIR value exceeds a first path threshold $TH_{FP}$ for the first time. In other words, the set 21 corresponds to the first incoming wave. The set 21 includes a first element $SP_{P1}$ having a peak CIR value for the first time after the specific element $SP_{FP}$. On the other hand, the set 22 includes a second element $SP_{P2}$ having a peak CIR value for the second time after the specific element $SP_{FP}$.

The CIR illustrated in FIG. 10 includes a set 23 of elements corresponding to the combined wave received in a state where the direct wave is combined with the delayed wave having a different phase from the direct wave. The CIR waveform of the set 23 has two peaks because two waves having different phases are combined. The CIR waveform of the set 23 has two peaks because two waves having different phases are combined. The set 23 includes a specific element $SP_{FP}$ that is an element whose CIR value exceeds a first path threshold $TH_{FP}$ for the first time. In other words, the set 23 corresponds to the first incoming wave. The set 23 includes a first element $SP_{P1}$ having a peak CIR value for the first time after the specific element $SP_{FP}$. The set 23 includes a second element $SP_{P2}$ having a peak CIR value for the second time after the specific element $SP_{FP}$.

In the case where the direct wave is detected as the first incoming wave, the first incoming wave has a CIR waveform with a single peak as illustrated in FIG. 9. On the other hand, in the case where the combined wave is detected as the first incoming wave, the first incoming wave has a CIR waveform with multiple peaks as illustrated in FIG. 10. In addition, it is possible to determine whether the first incoming wave has the CIR waveform with the single peak or the multiple peaks on the basis of a difference $T_{P1\_P2}$ between the delay time $T_{P1}$ of the first element $SP_{P1}$ and the delay time $T_{P2}$ of the second element $SP_{P2}$. This is because a large difference $T_{P1\_P2}$ is obtained in the case where the first incoming wave has the CIR waveform with the single peak. In addition, a smaller difference $T_{P1\_P2}$ is obtained in the case where the first incoming wave has the CIR waveform with the multiple peaks.

In the case where the combined wave is detected as the first incoming wave, accuracy of estimating the positional parameter deteriorates in comparison with the case where the direct wave is detected as the first incoming wave. Therefore, it can be said that the larger difference $T_{P1\_P2}$ means higher reliability. As described above, it is possible to evaluate reliability by using the difference $T_{P1\_P2}$. The difference $T_{P1\_P2}$ is the first reliability parameter.

Therefore, to control the positional parameter estimation process on the basis of the reliability parameter, the control section 230 estimates the positional parameter on the basis of the specific element whose difference $T_{P1\_P2}$ indicated by the reliability parameter is larger than a second threshold. For example, the control section 230 determines that the difference $T_{P1\_P2}$ illustrated in FIG. 9 is larger than the second threshold, and estimates the positional parameter on the basis of the specific element $SP_{FP}$ illustrated in FIG. 9. For another example, the control section 230 determines that the difference $T_{P1\_P2}$ illustrated in FIG. 10 is smaller than the second threshold, and does not estimate the positional parameter on the basis of the specific element $SP_{FP}$ illustrated in FIG. 10. Such a configuration makes it possible to estimate the positional parameter on the basis of the specific element obtained in the case where there is a high possibility that the direct wave is detected as the first incoming wave. This makes it possible to improve accuracy of estimating a positional parameter.

Here, an interval between a plurality of peaks included in the CIR waveform of the combined wave is smaller than the width of the single pulse. On the other hand, an interval between respective peaks of two separate waves is larger than the width of the single pulse. Therefore, the second threshold may be set to any value that is less than or equal to the width of the pulse. This makes it possible to determine whether or not the combined wave is detected as the first incoming wave.

Second Reliability Parameter

The reliability parameter may include a second reliability parameter derived from correlation between CIR waveforms of the wireless communication sections 210 in a pair. Details of the second reliability parameter will be described with reference to FIG. 11.

FIG. 11 is graphs illustrating examples of CIRs with regard to the plurality of wireless communication sections 210. A CIR 20A illustrated in FIG. 11 is a graph illustrating an example of a CIR with regard to a wireless communication section 210A. A CIR 20B illustrated in FIG. 11 is a graph illustrating an example of a CIR with regard to a wireless communication section 210B. Each graph includes a horizontal axis representing delay time. It is assumed that a time axis of the CIR 20A is synchronous with a time axis of the CIR 20B. The graph includes a vertical axis representing absolute values of CIR values (such as amplitude or electric power).

The CIR 20A includes a set 23A of elements corresponding to the combined wave received in a state where the direct wave is combined with the delayed wave having a different phase from the direct wave. The CIR waveform of the set 23A has two peaks because two waves having different phases are combined. The set 23A includes a specific element $SP_{FP}$ that is an element whose CIR value exceeds the first path threshold $TH_{FP}$ for the first time. In other words, the set 23A corresponds to the first incoming wave.

On the other hand, the CIR 20B includes a set 23B of elements corresponding to the combined wave received in a state where the direct wave is combined with the delayed wave having a same phase as the direct wave. The CIR waveform of the set 23 has a single large peak because two waves having the same phase are combined. The set 23B includes a specific element $SP_{FP}$ that is an element whose CIR value exceeds the first path threshold $TH_{FP}$ for the first time. In other words, the set 23B corresponds to the first incoming wave.

In the case where the plurality of wireless communication sections 210 receive signals in the state where the direct wave is combined with the delayed wave, the wireless communication sections 210 have different relations of phases of the direct wave and the delayed wave even if a distance between the wireless communication sections 210 is short. As a result, different CIR waveforms are obtained as illustrated in the CIR 20A and CIR 20B. In other words, the different CIR waveforms between the wireless communication sections 210 in a pair mean that a combined wave is received by at least one of the wireless communication sections 210 in the pair. In the case where the combined wave is detected as the first incoming wave, that is, in the case where detection of the specific element corresponding to the direct wave ends in failure, accuracy of estimating the positional parameter deteriorates.

Accordingly, the second reliability parameter may be a correlation coefficient between a CIR obtained on the basis of reception signal received by a first wireless communication section 210 among the plurality of wireless communication sections 210, and a CIR obtained on the basis of a reception signal received by a second wireless communication section 210 that is different from the first wireless communication section 210 among the plurality of wireless communication sections 210. In other words, the second reliability parameter may be a correlation coefficient between a waveform of the entire CIR calculated with regard to the first wireless communication section 210 and a waveform of the entire CIR calculated with regard to the second wireless communication section 210. In addition, the control section 230 determines that reliability gets higher as the correlation coefficient increases. On the other hand, the control section 230 determines that reliability gets lower as the correlation coefficient decreases. Such a configuration makes it possible to evaluate reliability from a viewpoint of correlation between CIR waveforms.

Here, the delay time and the phase of the specific element is used for the process of estimating the positional parameter. Therefore, the reliability parameter may be derived from correlation between CIR waveforms close to the specific element.

In other words, the second reliability parameter may be a correlation coefficient between chronological change in CIR value of a portion including the specific element in the CIR obtained on the basis of reception signal received by the first wireless communication section 210 among the plurality of wireless communication sections 210, and chronological change in CIR value of a portion including the specific element in the CIR obtained on the basis of the reception signal received by the second wireless communication section 210 that is different from the first wireless communication section 210 among the plurality of wireless communication sections 210. Here, the portion means a set including the specific element and one or more elements that exist before and/or after the specific element. In other words, the second reliability parameter may be a correlation coefficient between a waveform obtained in a vicinity of the specific element in the CIR calculated with regard to the first wireless communication section 210, and a waveform obtained in a vicinity of the specific element in the CIR calculated with regard to the second wireless communication section 210. In addition, the control section 230 determines that reliability gets higher as the correlation coefficient increases. On the other hand, the control section 230 determines that reliability gets lower as the correlation coefficient decreases. Such a configuration makes it possible to evaluate reliability from a viewpoint of correlation between CIR waveforms obtained in the vicinity of the specific element. In addition, such a configuration makes it possible to reduce an amount of calculation in comparison with the case of correlating waveforms of the entire CIR s.

To control the positional parameter estimation process on the basis of the reliability parameter, the control section 230 estimates the positional parameter on the basis of the specific element whose correlation coefficient indicated by the reliability parameter is higher than a third threshold. For example, the control section 230 calculates the correlation coefficient with regard to one or more pairs of any wireless communication sections 210. Next, in the case where all of the one or more correlation coefficients that have been calculated are higher than the third threshold, the control section 230 estimates the positional parameter on the basis of the specific elements detected with regard to the plurality of wireless communication sections 210. In other cases, the control section 230 does not estimate the positional parameter. Such a configuration makes it possible to estimate the positional parameter on the basis of the specific element obtained in the case where there is a high possibility that the direct wave is detected as the first incoming wave with regard to each of the plurality of wireless communication sections 210. This makes it possible to improve accuracy of estimating a positional parameter.

Note that, the correlation coefficient may be the Pearson correlation coefficient.

The CIR may include amplitude or electric power, which is a CIR value, as an element obtained at each delay time. In this case, the control section 230 calculates a correlation coefficient by correlating respective amplitudes or electric powers obtained at corresponding delay times, which are included in the two CIRs. Note that, the corresponding delay times indicates a same delay time in an environment where the time axes of the two CIRs are synchronous with each other.

The CIR may include a complex number, which is a CIR value, as the element obtained at each delay time. In this case, the control section 230 calculates a correlation coefficient by correlating respective complex numbers obtained at corresponding delay times, which are included in the two CIRs. The complex number includes a phase component in addition to an amplitude component. Therefore, it is possible to calculate a more accurate correlation coefficient than the case of calculating a correlation coefficient on the basis of amplitude or electric power.

Third Reliability Parameter

The reliability parameter may include a third reliability parameter that is a difference between delay time of a specific element and delay time of an element having a maximum CIT value in a CIR. Details of the third reliability parameter will be described with reference to FIG. 12 and FIG. 13.

Figure 12:
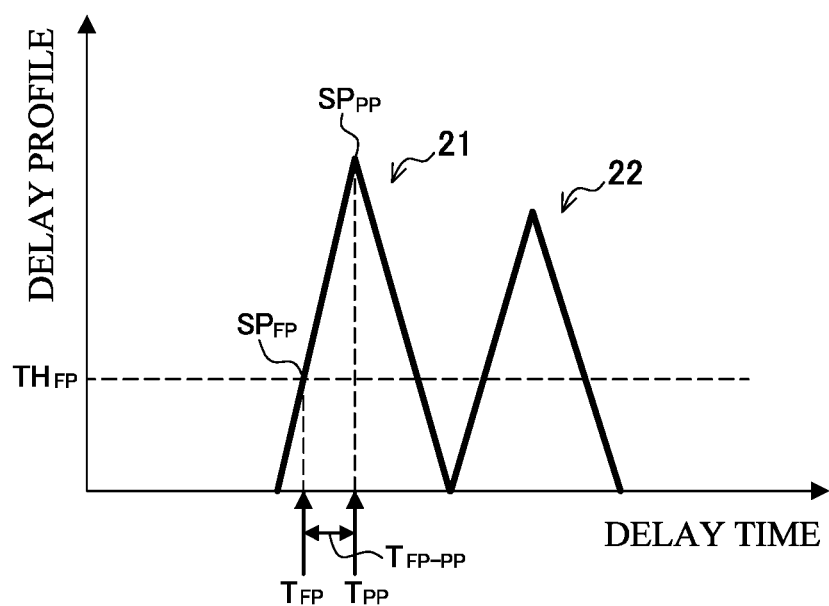
FIG. 12 is a graph illustrating an example of a CIR with regard to the wireless communication section in an LOS condition.
Figure 13:
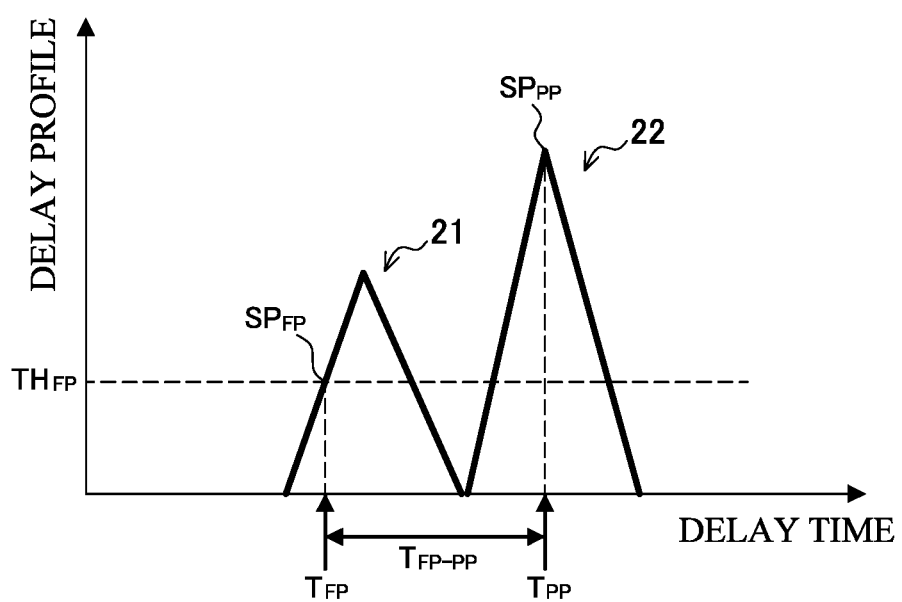
FIG. 13 is a graph illustrating an example of a CIR with regard to the wireless communication section in an NLOS condition.

FIG. 12 is a graph illustrating an example of a CIR with regard to the wireless communication section 210 in the LOS condition. FIG. 13 is a graph illustrating an example of a CIR with regard to the wireless communication section 210 in the NLOS condition. The graph includes a horizontal axis representing delay time. The graph includes a vertical axis representing absolute values of CIR values (such as electric power or amplitude).

The CIR illustrated in FIG. 12 include a set 21 of elements corresponding to the direct wave, and a set 22 of elements corresponding to the delayed wave. The set 21 includes a specific element $SP_{FP}$ that is an element whose CIR value exceeds a first path threshold $TH_{FP}$ for the first time. In other words, the set 21 corresponds to the first incoming wave. In addition, the set 21 includes an element $SP_{PP}$ having a maximum CIR value in the CIR.

The CIR illustrated in FIG. 13 include a set 21 of elements corresponding to the direct wave, and a set 22 of elements corresponding to the delayed wave. The set 21 includes a specific element $SP_{FP}$ that is an element whose CIR value exceeds a first path threshold $TH_{FP}$ for the first time. In other words, the set 21 corresponds to the first incoming wave. On the other hand, the set 22 includes an element $SP_{PP}$ having a maximum CIR value in the CIR.

In the case of the LOS condition, the direct wave has the largest CIR value. Therefore, as illustrated in FIG. 12, the set 21 corresponding to the direct wave includes the element $SP_{PP}$ having the maximum CIR value in the CIR.

On the other hand, in the case of the NLOS condition, a CIR value of the delayed wave may be larger than a CIR value of the direct wave. In the case of the NLOS condition, this is because there is an obstacle in the first path. In particular, in the case where a human body is interposed in the first path, the direct wave drastically attenuates when the direct wave passes through the human body. In this case, as illustrated in FIG. 13, the set 21 corresponding to the direct wave does not include the element $SP_{PP}$ having the maximum CIR value in the CIR.

It is possible to determine whether the wireless communication section 210 is in the LOS condition or the NLOS condition, on the basis of a difference $T_{FP\_PP}$ between delay time $T_{FP}$ of the specific element $SP_{FP}$ and delay time $T_{PP}$ of the element $SP_{PP}$ having the maximum CIR value in the CIR. This is because the difference $T_{FP\_PP}$ may be small in the case where the wireless communication section 210 is in the LOS condition as illustrated in FIG. 12. In addition, the difference $T_{FP\_PP}$ may be large in the case where the wireless communication section 210 is in the NLOS condition as illustrated in FIG. 13.

In the case of the NLOS condition, the accuracy of estimating the positional parameter deteriorates in comparison with the case of the LOS condition. Therefore, it can be said that higher reliability is obtained as the difference $T_{FP\_PP}$ decreases. As described above, it is possible to evaluate reliability by using the difference $T_{FP\_PP}$. The difference $T_{FP\_PP}$ is the third reliability parameter.

Therefore, to control the positional parameter estimation process on the basis of the reliability parameter, the control section 230 estimates the positional parameter on the basis of the specific element whose difference $T_{FP\_PP}$ indicated by the reliability parameter is smaller than a fourth threshold. For example, the control section 230 determines that the difference $T_{FP\_PP}$ illustrated in FIG. 12 is smaller than the fourth threshold, and estimates the positional parameter on the basis of the specific element $SP_{FP}$ illustrated in FIG. 12. For another example, the control section 230 determines that the difference $T_{FP\_PP}$ illustrated in FIG. 13 is larger than the fourth threshold, and does not estimate the positional parameter on the basis of the specific element $SP_{FP}$ illustrated in FIG. 13. Such a configuration makes it possible to estimate the positional parameter on the basis of the specific element that is likely to be detected with regard to the wireless communication section 210 in the LOS condition. This makes it possible to improve accuracy of estimating a positional parameter.

Fourth Reliability Parameter

The reliability parameter may include a fourth reliability parameter that is between electric power corresponding to a specific element in a CIR obtained on the basis of reception signal received by a first wireless communication section 210 among the plurality of wireless communication sections 210, and electric power corresponding to a specific element in a CIR obtained on the basis of a reception signal received by a second wireless communication section 210 that is different from the first wireless communication section 210 among the plurality of wireless communication sections 210. Next, details of the fourth reliability parameter will be described.

Hereinafter, the electric power corresponding to the specific element will be referred to as first-path-compliant electric power. For example, the first-path-compliant electric power may be electric power of an element having a peak CIR value for the first time after the specific element. The electric power serves as the CIR value. For another example, the first-path-compliant electric power may be a sum of electric powers of the specific element and one or more element subsequent to the specific element. The electric power serves as the CIR value.

A difference in the first-path-compliant electric power between the wireless communication sections 210 in a pair is decided by a difference between propagation distances from the portable device 100 to the respective wireless communication sections 210. This is because the radio wave attenuates in proportion to a square of the propagation distance. Note that, distances between the wireless communication sections 210 are set to a half or less of wavelength λ of a carrier wave of an angle estimation signal. Therefore, there is little difference in the propagation distances from the portable device 100 to the respective wireless communication sections 210. In other words, ideally, the first-path-compliant electric powers do not differ greatly between the wireless communication sections 210 in a pair.

However, first-path-compliant electric powers may differ greatly between the wireless communication sections 210 in the case where the combined wave is detected as the first incoming wave with regard to one of the wireless communication sections 210 in the pair. This is because the wireless communication sections 210 may have different relations of phases of two pulses to be combined even if a distance between the wireless communication sections 210 is short. For example, in the case where the two pulses to be combined have a same phase, the two pulses reinforce each other. Therefore, large first-path-compliant electric power is obtained with regard to the combined wave detected as the first incoming wave. For another example, in the case where the two pulses to be combined have opposite phases, the two pulses annihilate each other. Therefore, small first-path-compliant electric power is obtained with regard to the combined wave detected as the first incoming wave.

In the case where the combined wave is detected as the first incoming wave, accuracy of estimating the positional parameter deteriorates in comparison with the case where the direct wave is detected as the first incoming wave. Therefore, it can be said that higher reliability is obtained as a difference in the first-path-compliant electric power between the wireless communication sections 210 reduces. As described above, it is possible to evaluate reliability by using the difference in the first-path-compliant electric power between the wireless communication sections 210. The difference in the first-path-compliant electric power between the wireless communication sections 201 is the fourth reliability parameter.

Therefore, to control the positional parameter estimation process on the basis of the reliability parameter, the control section 230 estimates the positional parameter on the basis of the specific element whose difference in the first-path-compliant electric power between the wireless communication sections 210 indicated by the reliability parameter is smaller than a fifth threshold. For example, the control section 230 calculates the difference in the first-path-compliant electric power with regard to one or more pairs of any wireless communication sections 210. Next, in the case where all of the one or more differences in the first-path-compliant electric power are lower than the fifth threshold, the control section 230 estimates the positional parameter on the basis of the respective specific elements detected with regard to the plurality of wireless communication sections 210. In other cases, the control section 230 does not estimate the positional parameter. Such a configuration makes it possible to estimate the positional parameter on the basis of the specific element obtained in the case where there is a high possibility that the direct wave is detected as the first incoming wave with regard to each of the plurality of wireless communication sections 210. This makes it possible to improve accuracy of estimating a positional parameter.

Fifth Reliability Parameter

The fifth reliability parameter is an indicator that indicates whether the first incoming wave itself is the appropriate detection target. In other words, the fifth reliability parameter is an indicator that indicates whether the specific element itself is the appropriate detection target. Higher reliability is obtained as the first incoming wave is more appropriate for the processing target, and lower reliability is obtained as the first incoming wave is more inappropriate for the processing target.

Specifically, the fifth reliability parameter may be an indicator that indicates magnitude of noise. In this case, the fifth reliability parameter is calculated on the basis of at least any of a signal-to-noise ratio (SNR) and electric power of the first incoming wave. In the case where the electric power is high, influence of the noise is small. Therefore, the fifth reliability parameter indicating that the first incoming wave is appropriate for the detection target is calculated. On the other hand, in the case where the electric power is low, influence of the noise is small. Therefore, the fifth reliability parameter indicating that the first incoming wave is inappropriate for the detection target is calculated. In the case where the SNR is high, the influence of the noise is small. Therefore, the fifth reliability parameter indicating that the first incoming wave is appropriate for the detection target is calculated. On the other hand, in the case where the SNR is low, effects of the noise are large. Therefore, the fifth reliability parameter indicating that the first incoming wave is inappropriate for the detection target is calculated.

By using the fifth reliability parameter, it is possible to evaluate reliability on the basis of whether the first incoming wave itself is appropriate for the detection target.

Sixth Reliability Parameter

The sixth reliability parameter is an indicator that indicates adequacy of a direct wave for the first incoming wave. In other words, the sixth reliability parameter is an indicator that indicates suitability of the specific element for an element corresponding to the direct wave. Higher reliability is obtained as the adequacy of the direct wave for the first incoming wave gets higher, and lower reliability is obtained as the adequacy of the direct wave for the first incoming wave gets lower.

The sixth reliability parameter may be calculated on the basis of consistency between the respective first incoming waves of the plurality of the wireless communication sections 210. Specifically, the sixth reliability parameter is calculated on the basis of at least any of reception time and electric power of the first incoming wave with regard to each of the plurality of wireless communication sections 210. By the effect of multipath, a plurality of wireless signals coming through different paths may be combined and received by the wireless communication sections 210 in a state where the signals are amplified or offset. Next, in the case where ways of amplifying and offsetting the wireless signals are different between the plurality of wireless communication sections 210, different reception times and different electric power values may be obtained with regard to the first incoming waves between the wireless communication sections 210. When considering that distances between the wireless communication sections 210 are short distances that are a half or less of the wavelength λ of the angle estimation signal, a large difference in the reception times and electric powers of the first incoming waves between the wireless communication sections 210 means low suitability of the direct waves for the first incoming waves.

Therefore, a sixth reliability parameter is calculated in such a manner that the sixth reliability parameter indicates that the suitability of the direct waves for the first incoming waves gets lower as the difference in reception time of the first incoming wave (that is, delay time of the specific element) between the wireless communication sections 210 gets larger. On the other hand, the sixth reliability parameter is calculated in such a manner that the sixth reliability parameter indicates that the suitability of the direct waves for the first incoming waves gets higher as the difference in reception time of the first incoming wave between the wireless communication sections 210 gets smaller. In addition, the sixth reliability parameter is calculated in such a manner that the sixth reliability parameter indicates that the suitability of the direct wave for the first incoming wave gets lower as the difference in electric power of the first incoming wave between the wireless communication sections 210 gets larger. On the other hand, the sixth reliability parameter is calculated in such a manner that the sixth reliability parameter indicates that the suitability of the direct wave for the first incoming wave gets higher as the difference in electric power of the first the first incoming wave between the wireless communication sections 210 gets smaller.

The sixth reliability parameter may be calculated on the basis of consistency between positional parameters indicating positions of the portable device 100 estimated on the basis of the respective first incoming waves received by the plurality of wireless communication sections 210 in pairs. Each of the pair includes two different wireless communication sections 210 among the plurality of wireless communication sections 210. Here, the positional parameters are the angles α and β illustrated in FIG. 3 and the coordinates (x, y, z) illustrated in FIG. 4. In the case where the first incoming waves are the direct waves, same or substantially same results are obtained with regard to the angles α and β and the coordinates (x, y, z) even if different combinations are used as the pairs of the wireless communication sections 210 for calculating the angles α and β and the coordinates (x, y, z). However, in the case where the first incoming waves are not the direct waves, different results may be obtained from the different pairs of the wireless communication sections 210 with regard to the angles α and β and the coordinates (x, y, z).

Accordingly, the sixth reliability parameter is calculated in such a manner that the sixth reliability parameter indicates that the adequacy of the direct waves for the first incoming waves gets higher as the difference in positional parameter calculation result between different combinations of the antenna pairs. For example, the sixth reliability parameter is calculated in such a manner that the sixth reliability parameter indicates that the adequacy of the direct waves for the first incoming waves gets higher as an error between $\alpha_{AC}$ and $\alpha_{BD}$ gets smaller and as an error between $\beta_{DC}$ and $\beta_{BA}$ gets smaller. On the other hand, the sixth reliability parameter is calculated in such a manner that the sixth reliability parameter indicates that the adequacy of the direct waves for the first incoming waves gets lower as the difference in positional parameter calculation result between different combinations of the antenna pairs gets larger. For example, the sixth reliability parameter is calculated in such a manner that the sixth reliability parameter indicates that the adequacy of a direct waves for the first incoming waves gets lower as an error between $\alpha_{AC}$ and $\alpha_{BD}$ gets larger and as an error between $\beta_{DC}$ and $\beta_{BA}$ gets larger. These angles have been described above with regard to the angle estimation process.

By using the sixth reliability parameter, it is possible to evaluate the reliability on the basis of the adequacy of the direct waves for the first incoming waves.

Seventh Reliability Parameter

The seventh reliability parameter is an indicator that indicates inadequacy of a combined wave for the first incoming wave. In other words, the seventh reliability parameter is an indicator that indicates unsuitability of the specific element for the combined wave. Higher reliability is obtained as the unsuitability of the combined wave for the first incoming wave gets higher, and lower reliability is obtained as the suitability of the combined wave for the first incoming wave gets lower.

Specifically, the seventh reliability parameter is calculated on the basis of at least any of width of the first incoming wave in the time direction and a state of the phase of the first incoming wave.

First, with reference to FIG. 14, calculation of the seventh reliability parameter based on the width of the first incoming wave in the time direction will be described. Here, the width of the first incoming wave in the time direction may be width of an element corresponding to the first incoming wave in the time direction, with regard to the CIR.

Figure 14:
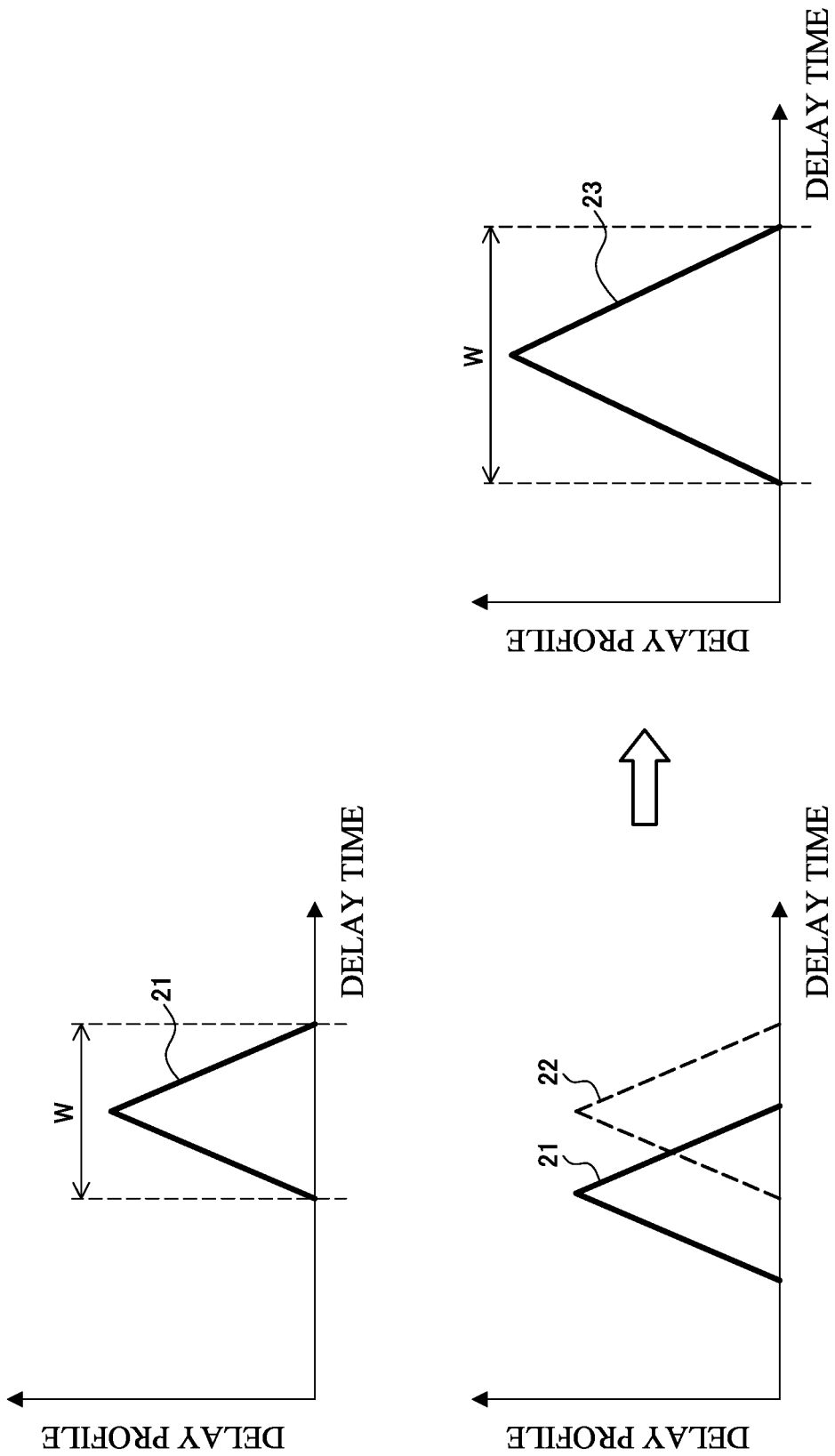
FIG. 14 is diagrams for describing examples of reliability parameters according to the embodiment.

FIG. 14 is diagrams for describing examples of the reliability parameter according to the present embodiment. In the case where the direct wave is independently received as illustrated in the top of FIG. 14, width W of a set 21 of elements corresponding to the direct wave in the CIR serves as an ideal width obtained when only the direct wave is detected as the first incoming wave. Here, the width W is width of a set of elements corresponding to a single pulse in the time direction. For example, the width W is width between a zero-crossing and another zero-crossing. For another example, the width W is width between intersections of a standard and varied CIR values. On the other hand, when the wireless communication sections 210 receive the plurality of wireless signals came through different paths in a state where the plurality of pulses are combined, the width W of a set of elements corresponding to the combined wave in the CIR may be different from the ideal width obtained when only the direct wave is detected as the first incoming wave, due to influence of multipath. For example, when a delayed wave having a same phase as the direct wave is received in such a manner that the delayed wave is combined with the direct wave as illustrated in the bottom of FIG. 14, the set 21 of elements corresponding to the direct wave and the set 22 of elements corresponding to the delayed wave are added in a state where they are shifted in the time direction. Therefore, the set 23 of elements corresponding to the combined wave in the CIR has a wide width W. On the other hand, when a delayed wave having an opposite phase from the direct wave is received in such a manner that the delayed wave is combined with the direct wave, the direct wave and the delayed wave annihilate each other. Therefore, a set of elements corresponding to the combined wave in the CIR has a narrow width W.

As described above, the seventh reliability parameter is calculated in such a manner that the seventh reliability parameter indicates that the inadequacy of the combined wave for the first incoming wave gets higher as the difference between the width of the first incoming wave and the ideal width obtained when only the direct wave is detected as the first incoming wave gets smaller. On the other hand, the seventh reliability parameter is calculated in such a manner that the seventh reliability parameter indicates that the inadequacy of the combined wave for the first incoming wave gets lower as the difference between the width of the first incoming wave and the ideal width obtained when only the direct wave is detected as the first incoming wave gets larger.

Next, with reference to FIG. 15, calculation of the seventh reliability parameter based on a state of phase of the first incoming wave will be described. Here, the state of the phase of the first incoming wave may be a degree of difference in phase between elements corresponding to the first incoming wave in the received wireless signal. Alternatively, the state of the phase of the first incoming wave may be a degree of difference in phase between elements corresponding to the first incoming wave in the CIR.

FIG. 15 is diagrams for describing examples of the reliability parameter according to the present embodiment. In the case where only the direct wave is independently received as illustrated in the top of FIG. 15, respective phases θ of a plurality of elements belonging to the set 21 corresponding to the direct wave in the CIR are a same or substantially same phase (that is, θ1≈θ2≈θ3). Note that, the phase is an angle between IQ components of a CIR and an I axis on an IQ plane. This is because distances of paths of direct waves are the same with regard to the respective elements. On the other hand, in the case where the combined wave is received as illustrated in the bottom of FIG. 15, respective phases θ of a plurality of elements belonging to the set 23 of elements corresponding to the combined wave in the CIR are different phases (that is, θ1≠θ2≠θ3). This is because pulses having different distances between the transmitter and the receiver, that is, the pulses having different phases are combined. As described above, the seventh reliability parameter is calculated in such a manner that the seventh reliability parameter indicates that the unsuitability of the combined wave for the first incoming wave gets higher as the difference between the phases of elements corresponding to the first incoming wave gets smaller. On the other hand, the seventh reliability parameter is also calculated in such a manner that the seventh reliability parameter indicates that the unsuitability of the combined wave for the first incoming wave gets lower as the difference between the phases of the elements corresponding to the first incoming wave gets larger.

By using the seventh reliability parameter, it is possible to evaluate the reliability on the basis of the unsuitability of the combined wave for the first incoming wave.

(3) Flow of Process

Various kinds of methods can be used for controlling the positional parameter estimation process on the basis of the reliability parameter. Next, two specific examples will be described with regard to the control methods.

First Example

The control section 230 may repeatedly perform position estimation communication N number of times. The position estimation communication means that the plurality of wireless communication sections 201 receive a wireless signal (ranging signal and/or angle estimation signal) from the portable device 100. N is an integer that is two or more.

The control section 230 calculates respective CIR s with regard to the plurality of wireless communication sections 210 on the basis of the reception signals received by the plurality of wireless communication sections 210 through single position measurement communication. Next, the control section 230 detects the specific elements with regard to the plurality of wireless communication sections 210. In addition, the control section 230 calculates the reliability parameters.

By repeatedly performing the position estimation communication N number of times, it is possible for the communication unit 200 to obtain N number of combinations of the plurality of specific elements and reliability parameters detected with regard to the respective wireless communication sections 210.

The control section 230 performs the positional parameter estimation process on the basis of the specific element in a combination. The combination includes a reliability parameter with the highest reliability or a reliability parameter indicating higher reliability than a predetermined threshold, among the N number of combinations. Such a configuration makes it possible to estimate the positional parameter on the basis of a specific element with the highest reliability or a specific element with higher reliability than the predetermined threshold, among specific elements obtained through N number of times of the position estimation communication. This makes it possible to improve accuracy of estimating a positional parameter.

Figure 16:
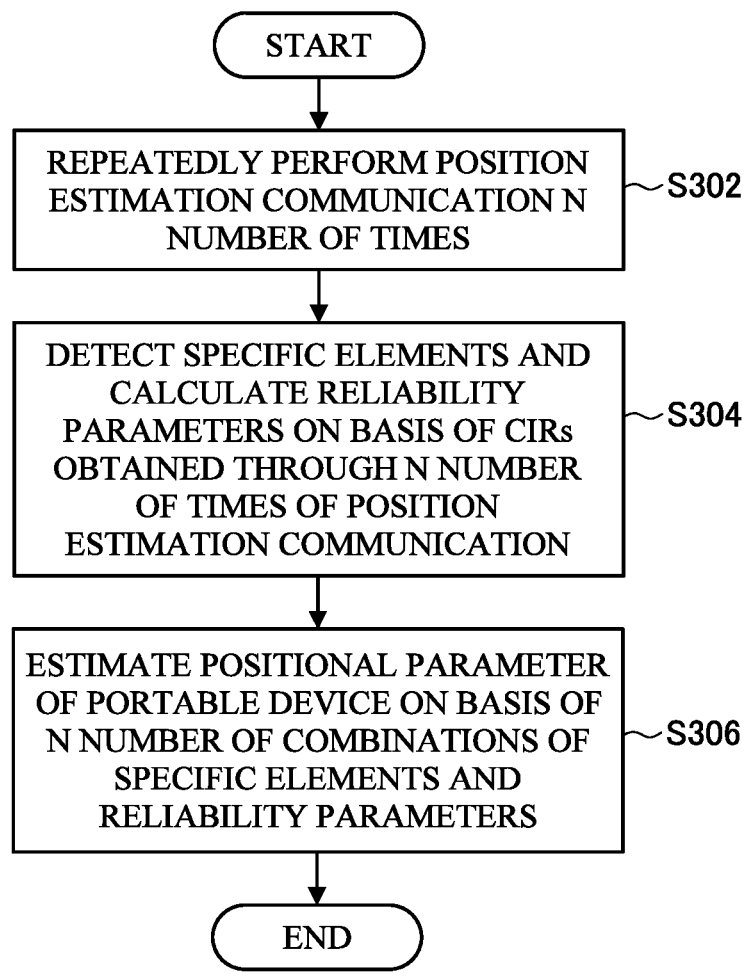
FIG. 16 is a flowchart illustrating an example of a flow of a control process of a positional parameter estimation process executed by the communication unit according to the embodiment on the basis of the reliability parameters.

Next, with reference to FIG. 16, a flow of a process will be described with regard to such an example. FIG. 16 is a flowchart illustrating an example of a flow of a control process of a positional parameter estimation process executed by the communication unit 200 according to the present embodiment on the basis of the reliability parameters.

As illustrated in FIG. 16, the communication unit 200 first repeatedly performs the position estimation communication N number of times (Step S302).

Next, the control section 230 detects the specific elements and calculates the reliability parameters on the basis of CIR s obtained through the N number of times of position estimation communication (Step S304). This makes it possible to obtain N number of combinations of the plurality of specific elements and reliability parameters detected with regard to the respective wireless communication sections 210.

Next, the control section 230 estimates a positional parameter of the portable device 100 on the basis of N number of combinations of the specific elements and the reliability parameters obtained in Step S304 (Step S306). Specifically, the control section 230 performs the positional parameter estimation process on the basis of the specific element in a combination including a reliability parameter with the highest reliability or a reliability parameter indicating higher reliability than the predetermined threshold, among the N number of combination.

Second Example

The control section 230 may repeatedly perform the positional estimation communication until a reliability parameter indicating higher reliability than the predetermined threshold is obtained. In this case, the control section 230 performs the positional parameter estimation process on the basis of a specific element detected through position estimation communication through which the reliability parameter indicating the higher reliability than the predetermined threshold is obtained. Such a configuration makes it possible to estimate the positional parameter on the basis of the specific element with the higher reliability than the predetermined threshold. This makes it possible to improve accuracy of estimating a positional parameter.

Figure 17:
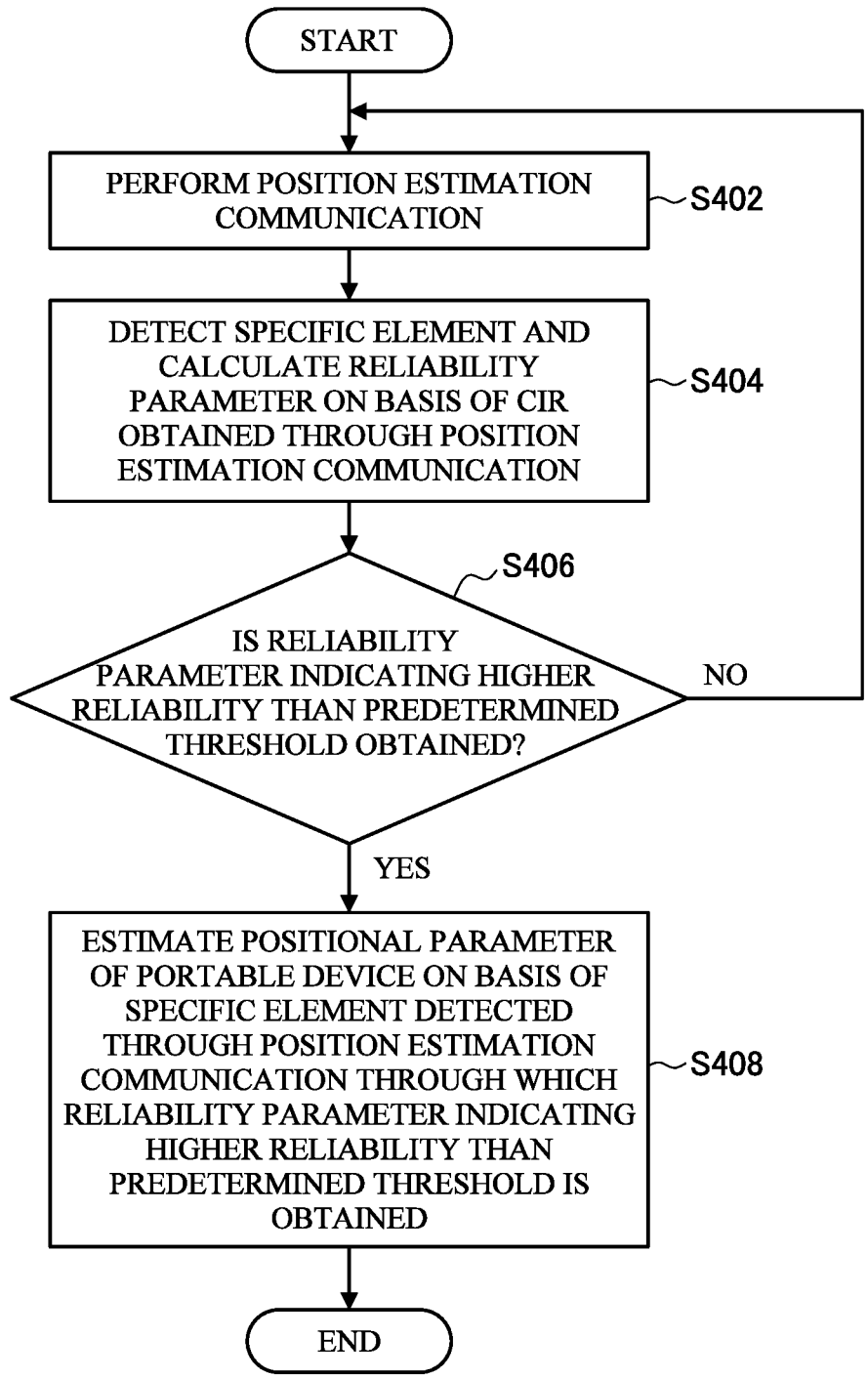
FIG. 17 is a flowchart illustrating an example of a flow of a control process of a positional parameter estimation process executed by the communication unit according to the embodiment on the basis of the reliability parameters.

Next, with reference to FIG. 17, a flow of a process will be described with regard to such an example. FIG. 17 is a flowchart illustrating an example of a flow of a control process of a positional parameter estimation process executed by the communication unit 200 according to the present embodiment on the basis of the reliability parameters.

As illustrated in FIG. 17, the communication unit 200 first performs the position estimation communication (Step S402).

Next, the control section 230 detects the specific element and calculates the reliability parameter on the basis of a CIR obtained through the position estimation communication (Step S404).

Next, the control section 230 determines whether or not a reliability parameter indicating higher reliability than the predetermined threshold is obtained (Step S406).

The process returns to Step S402 in the case where it is determined that the reliability parameter indicating higher reliability than the predetermined threshold is not obtained (NO in Step S406).

On the other hand, in the case where it is determined that the reliability parameter indicating higher reliability than the predetermined threshold is obtained (YES in Step S406), the positional parameter of the portable device 100 is estimated on the basis of the specific element detected through the position estimation communication through which the reliability parameter is obtained (Step S408).

Third Example

The control section 230 does not have to always repeat the position estimation communication. The control section 230 may perform the positional parameter estimation process on the basis of a specific element corresponding to a reliability parameter indicating higher reliability than the predetermined threshold, at least with regard to the reliability parameter that is calculable for each wireless communication section 210. For example, there may be a situation where only a specific element detected with regard to the wireless communication section 210A has low reliability among the specific elements detected with regard to the wireless communication sections 210A to 210D. In such a situation, the control section 230 may estimate the positional parameter of the portable device 100 on the basis of the specific elements detected with regard to the wireless communication sections 210B to 210D.

Figure 18:
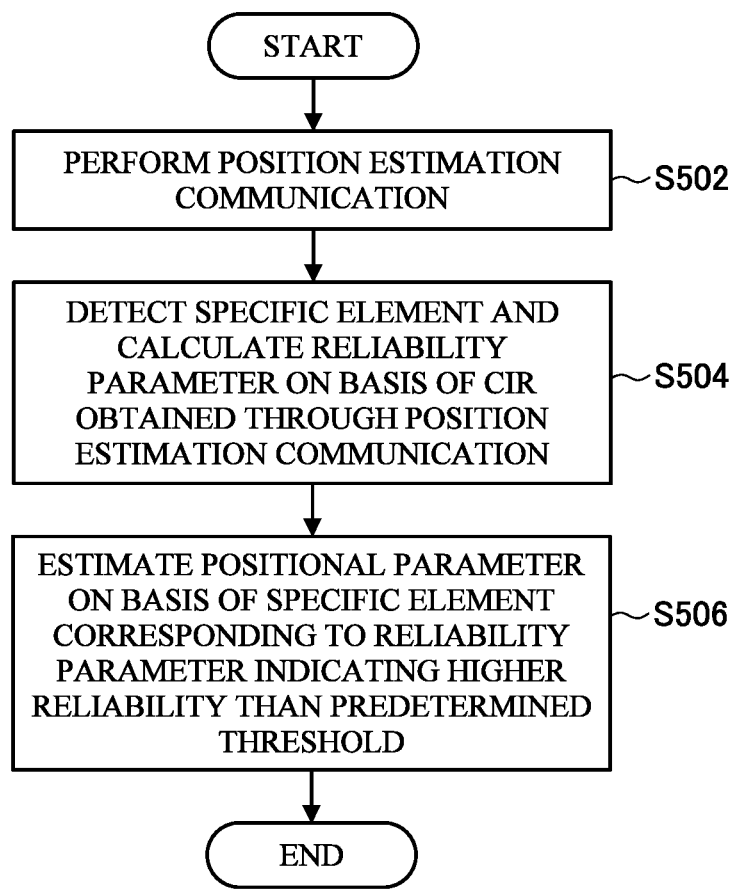
FIG. 18 is a flowchart illustrating an example of a flow of a control process of a positional parameter estimation process executed by the communication unit according to the embodiment on the basis of the reliability parameters.

Next, with reference to FIG. 18, a flow of a process will be described with regard to such an example. FIG. 18 is a flowchart illustrating an example of a flow of a control process of a positional parameter estimation process executed by the communication unit 200 according to the present embodiment on the basis of the reliability parameters.

As illustrated in FIG. 18, the communication unit 200 first performs the position estimation communication (Step S502).

Next, the control section 230 detects the specific element and calculates the reliability parameter on the basis of a CIR obtained through the position estimation communication (Step S504).

Next, the control section 230 estimates the positional parameter on the basis of a specific element corresponding to a reliability parameter indicating higher reliability than the predetermined threshold among the specific elements detected in Step S504 (Step S506).

5. Supplement

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

For example, it is also possible to use a combination of any two or more reliability parameters among the plurality of reliability parameters described in the above embodiment.

For example, in the above-described embodiment, the specific element is an element whose CIR value exceeds the first path threshold for the first time. However, the present invention is not limited thereto. For example, the specific element may be an element whose CIR value exceeds the first path threshold for the second time.

For example, in the above-described embodiment, the receiver calculates the CIR and calculates the first incoming wave. However, the present invention is not limited thereto. The receiver may detect the first incoming wave on the basis of the reception signal without calculating the CIR. For example, the receiver may use a condition that the amplitude or reception electric power of the received wireless signal exceeds a predetermined threshold for the first time, as the predetermined detection standard for detecting the first incoming wave. In this case, the receiver may detect a signal having amplitude or reception electric power that exceeds the predetermined threshold for the first time, as the first incoming wave among reception signals.

For example, in the above-described embodiment, the control section 230 calculates the CIR, detects the first incoming wave (that is, specific element), and estimates the positional parameter. However, the present invention is not limited thereto. Any of the above-described processes may be performed by the wireless communication section 210. For example, each of the plurality of wireless communication sections 210 may calculate the CIR and detect the first incoming wave on the basis of the reception signal received by each of the plurality of wireless communication sections 210. In addition, the positional parameter may be estimated by the wireless communication section 210 that functions as the master.

For example, according to the above-described embodiment, the description has been given with reference to the example in which the angles α and β are calculated on the basis of antenna array phase differences between antennas in a pair. However, the present invention is not limited thereto. For example, the communication unit 200 may calculate the angles α and β through beamforming using the plurality of antennas 211. In this case, the communication unit 200 scans main lobes of the plurality of antennas 211 in all the directions, determines that the portable device 100 exists in a direction with largest reception electric power, and calculates the angles α and β on the basis of this direction.

For example, according to the above-described embodiment, as described with reference to FIG. 3, the local coordinate system has been treated as a coordinate system including coordinate axes parallel to axes connecting the antennas in the pairs. However, the present invention is not limited thereto. For example, the local coordinate system may be a coordinate system including coordinate axes that are not parallel to the axes connecting the antennas in the pairs. In addition, the origin is not limited to the center of the plurality antennas 211. The local coordinate system according to the present embodiment may be arbitrarily set on the basis of arrangement of the plurality of antennas 211 of the communication unit 200.

For example, although the example in which the portable device 100 serves as the authenticatee and the communication unit 200 serves as the authenticator has been described in the above embodiment, the present invention is not limited thereto. The roles of the portable device 100 and the communication unit 200 may be reversed. For example, the positional parameter may be estimated by the portable device 100. In addition, the roles of the portable device 100 and the communication unit 200 may be switched dynamically. In addition, a plurality of the communication units 200 may determine the positional parameters, and perform authentication.

For example, although the example in which the present invention is applied to the smart entry system has been described in the above embodiment, the present invention is not limited thereto. The present invention is applicable to any system that estimates the positional parameter and performs the authentication by transmitting/receiving signals. For example, the present invention is applicable to a pair of any two devices selected from a group including portable devices, vehicles, smartphones, drones, houses, home appliances, and the like. In this case, one in the pair operates as the authenticator, and the other in the pair operates as the authenticatee. Note that, the pair may include two device of a same type, or may include two different types of devices. In addition, the present invention is applicable to a case where a wireless local area network (LAN) router estimates a position of a smartphone.

For example, in the above embodiment, the standard using UWB has been exemplified as the wireless communication standard. However, the present invention is not limited thereto. For example, it is also possible to use a standard using infrared as the wireless communication standard.

Note that, a series of processes performed by the devices described in this specification may be achieved by any of software, hardware, and a combination of software and hardware. A program that configures software is stored in advance in, for example, a recording medium (non-transitory medium) installed inside or outside the devices. In addition, for example, when a computer executes the programs, the programs are read into random access memory (RAM), and executed by a processor such as a CPU. The recording medium may be a magnetic disk, an optical disc, a magneto-optical disc, flash memory, or the like. Alternatively, the above-described computer program may be distributed via a network without using the recording medium, for example.

Further, in the present specification, the processes described using flowcharts are not necessarily executed in the order illustrated in the drawings. Some processing steps may be executed in parallel. In addition, additional processing steps may be employed and some processing steps may be omitted.

REFERENCE SIGNS LIST

1 system
100 portable device
110 wireless communication section
111 antenna
120 storage section
130 control section
200 communication unit
202 vehicle
210 wireless communication section
211 antenna
220 storage section
230 control section

What is claimed is:

1. A communication device comprising:
a plurality of wireless communication sections, each of which is configured to be capable of wirelessly transmitting and receiving a signal to and from another communication device; and
a control section configured to
correlate a first signal that is transmitted from the other communication device and that includes change in amplitude with respective second signals obtained when the plurality of wireless communication sections receive the first signal, at a designated interval after the other device transmits the first signal,
detect, on a basis of a first threshold, a specific element that is one or more of a plurality of elements included in a correlation computation result, with regard to each of a plurality of the correlation computation results that are results obtained by correlating the first signal and the respective second signals at the designated interval and that includes a correlation value indicating magnitude of correlation between the first signal and the second signal as the element obtained at each delay time serving as time elapsed after the other communication device transmits the first signal at the designated interval,
calculate a reliability parameter that is an indicator indicating whether the detected specific element is appropriate for a processing target, and
control a positional parameter determination process on a basis of the reliability parameter, the positional parameter determination process being a process of estimating a positional parameter indicating a position of the other communication device on a basis of the detected specific element.

2. The communication device according to claim 1, wherein, to detect the specific element on a basis of the first threshold, the control section detects an element having a correlation value that exceeds the first threshold for first time, as the specific element.

3. The communication device according to claim 1, wherein the reliability parameter includes a difference between delay time of a first element and delay time of a second element in the correlation computation result, the first element having a peak correlation value for the first time after the specific element, the second element having a peak correlation value for second time after the specific element.

4. The communication device according to claim 3, wherein, to control the positional parameter estimation process on a basis of the reliability parameter, the control section estimates the positional parameter on a basis of the specific element whose difference indicated by the reliability parameter is larger than a second threshold.

5. The communication device according to claim 4, wherein the second threshold is any value that is less than or equal to width of the change in amplitude in time direction, which is included in the first signal.

6. The communication device according to claim 1, wherein the reliability parameter includes a correlation coefficient between the correlation computation result obtained on a basis of the second signal received by a first wireless communication section among the plurality of wireless communication sections, and the correlation computation result obtained on a basis of the second signal received by a second wireless communication section that is different from the first wireless communication section among the plurality of wireless communication sections.

7. The communication device according to claim 6, wherein the reliability parameter includes a correlation coefficient between chronological change in correlation value of a portion including the specific element in the correlation computation result obtained on a basis of the second signal received by a first wireless communication section among the plurality of wireless communication sections, and chronological change in correlation value of a portion including the specific element in the correlation computation result obtained on a basis of the second signal received by a second wireless communication section that is different from the first wireless communication section among the plurality of wireless communication sections.

8. The communication device according to claim 6, wherein
the correlation computation result includes a complex number, which is the correlation value, as the element obtained at each delay time, and
the control section calculates the correlation coefficient by correlating complex numbers obtained at respective delay times, which are included in the two correlation computation results.

9. The communication device according to claim 6, wherein, to control the positional parameter estimation process on a basis of the reliability parameter, the control section estimates the positional parameter on a basis of the specific element whose correlation coefficient indicated by the reliability parameter is higher than a third threshold.

10. The communication device according to claim 1, wherein the reliability parameter includes a difference between the delay time of the specific element and the delay time of the element having a maximum correlation value in the correlation computation result.

11. The communication device according to claim 10, wherein, to control the positional parameter estimation process on a basis of the reliability parameter, the control section estimates the positional parameter on a basis of the specific element whose difference indicated by the reliability parameter is smaller than a fourth threshold.

12. The communication device according to claim 1, wherein the reliability parameter includes a difference between electric power corresponding to the specific element in the correlation computation result obtained on a basis of the second signal received by a first wireless communication section among the plurality of wireless communication sections, and electric power corresponding to the specific element in the correlation computation result obtained on a basis of the second signal received by a second wireless communication section that is different from the first wireless communication section among the plurality of wireless communication sections.

13. The communication device according to claim 12, wherein, to control the positional parameter estimation process on a basis of the reliability parameter, the control section estimates the positional parameter on a basis of the specific element whose difference indicated by the reliability parameter is smaller than a fifth threshold.

14. An information processing method that is executed by a communication device including a plurality of wireless communication sections, each of which is configured to be capable of wirelessly transmitting and receiving a signal to and from another communication device, the information processing method comprising:
correlating a first signal that is transmitted from the other communication device and that includes change in amplitude with respective second signals obtained when the plurality of wireless communication sections receive the first signal, at a designated interval after the other device transmits the first signal;
detecting, on a basis of a first threshold, a specific element that is one or more of a plurality of elements included in a correlation computation result, with regard to each of a plurality of the correlation computation results that are results obtained by correlating the first signal and the respective second signals at the designated interval and that includes a correlation value indicating magnitude of correlation between the first signal and the second signal as the element obtained at each delay time serving as time elapsed after the other communication device transmits the first signal at the designated interval;
calculating a reliability parameter that is an indicator indicating whether the detected specific element is appropriate for a processing target; and
controlling a positional parameter determination process on a basis of the reliability parameter, the positional parameter determination process being a process of estimating a positional parameter indicating a position of the other communication device on a basis of the detected specific element.

15. A non-transitory computer readable storage medium having a program stored therein, the program causing a computer for controlling a communication device including a plurality of wireless communication sections, each of which is configured to be capable of wirelessly transmitting and receiving a signal to and from another communication device, to function as
a control section configured to
correlate a first signal that is transmitted from the other communication device and that includes change in amplitude with respective second signals obtained when the plurality of wireless communication sections receive the first signal, at a designated interval after the other device transmits the first signal,
detect, on a basis of a first threshold, a specific element that is one or more of a plurality of elements included in a correlation computation result, with regard to each of a plurality of the correlation computation results that are results obtained by correlating the first signal and the respective second signals at the designated interval and that includes a correlation value indicating magnitude of correlation between the first signal and the second signal as the element obtained at each delay time serving as time elapsed after the other communication device transmits the first signal at the designated interval,
calculate a reliability parameter that is an indicator indicating whether the detected specific element is appropriate for a processing target, and
control a positional parameter determination process on a basis of the reliability parameter, the positional parameter determination process being a process of estimating a positional parameter indicating a position of the other communication device on a basis of the detected specific element.

* * * * *